May 4, 1943.  C. T. JACKSON  2,318,314
TYPEWRITING MACHINE
Filed Sept. 16, 1939  12 Sheets-Sheet 9

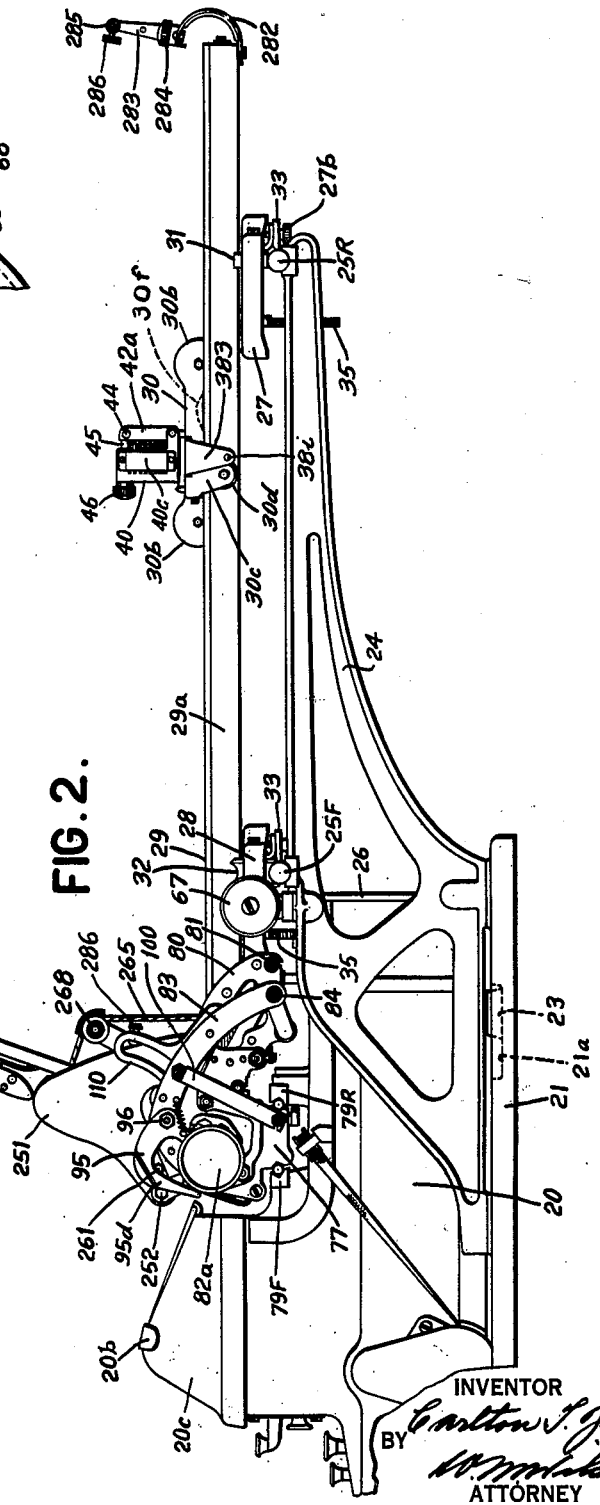

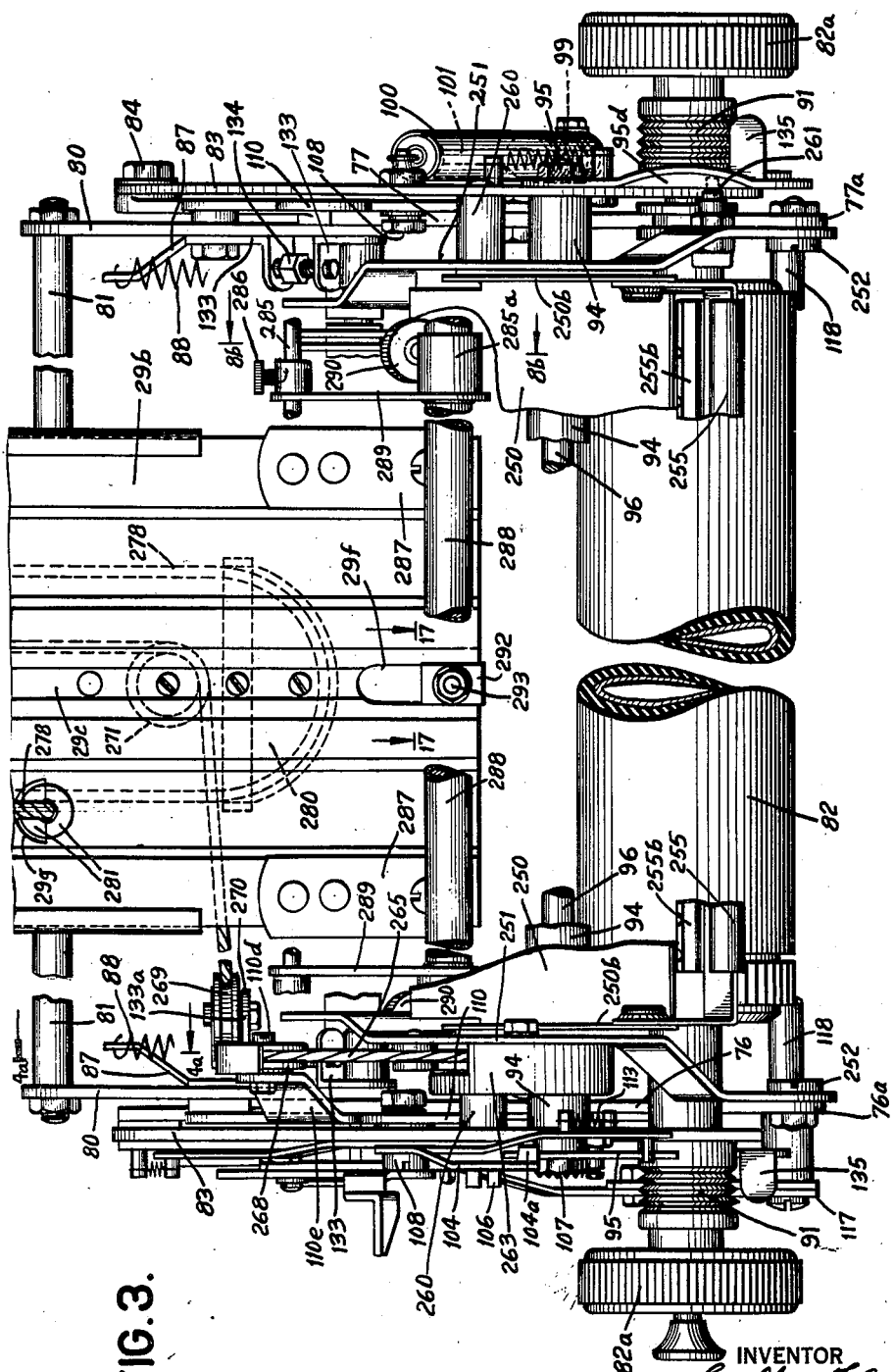

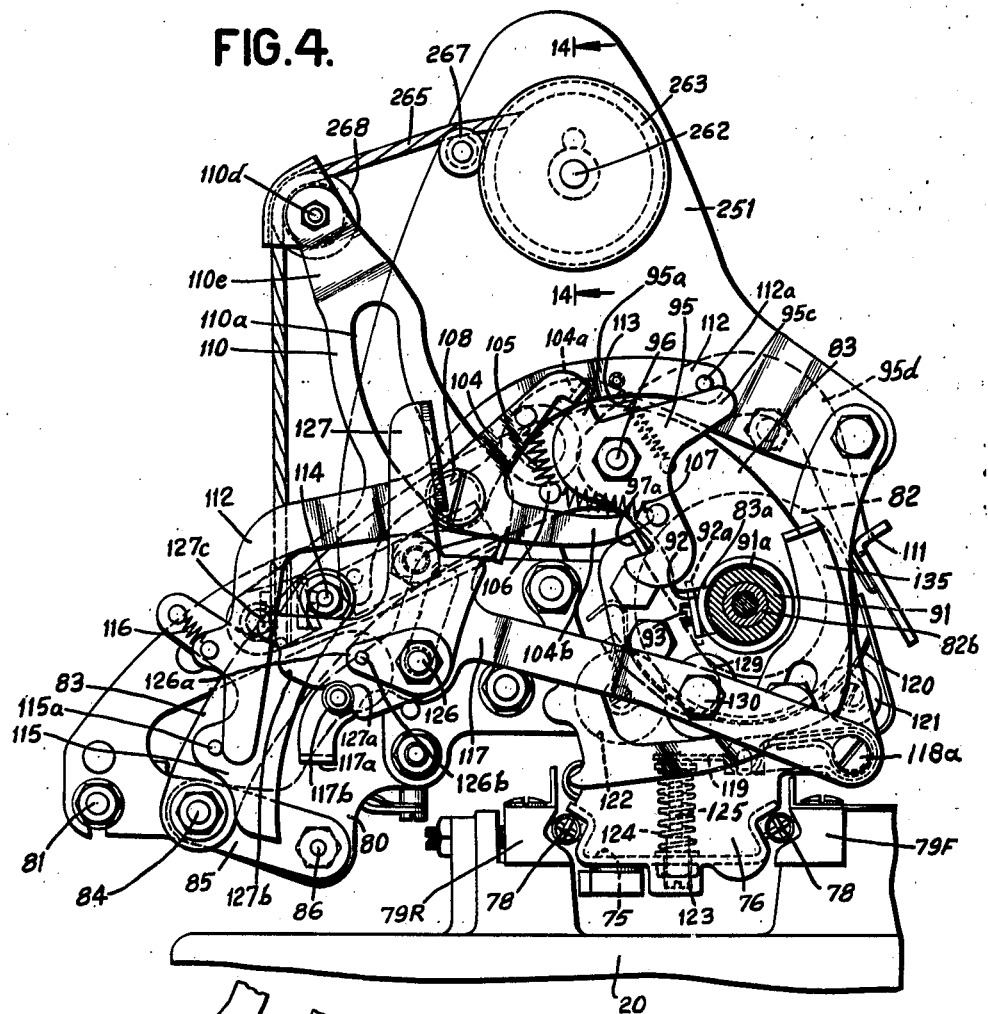
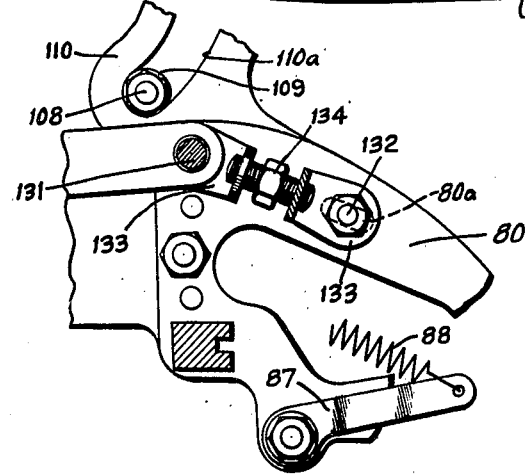

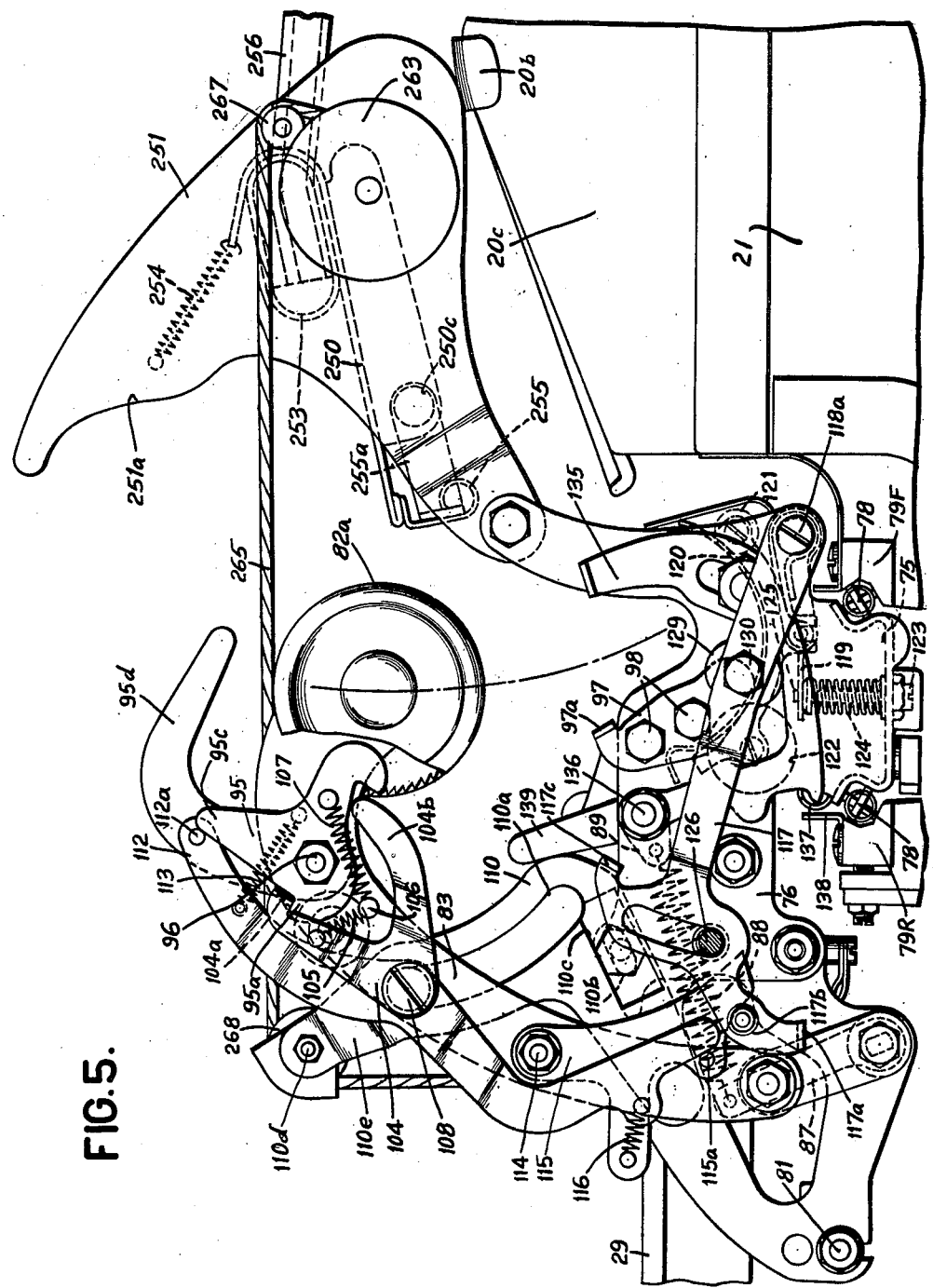

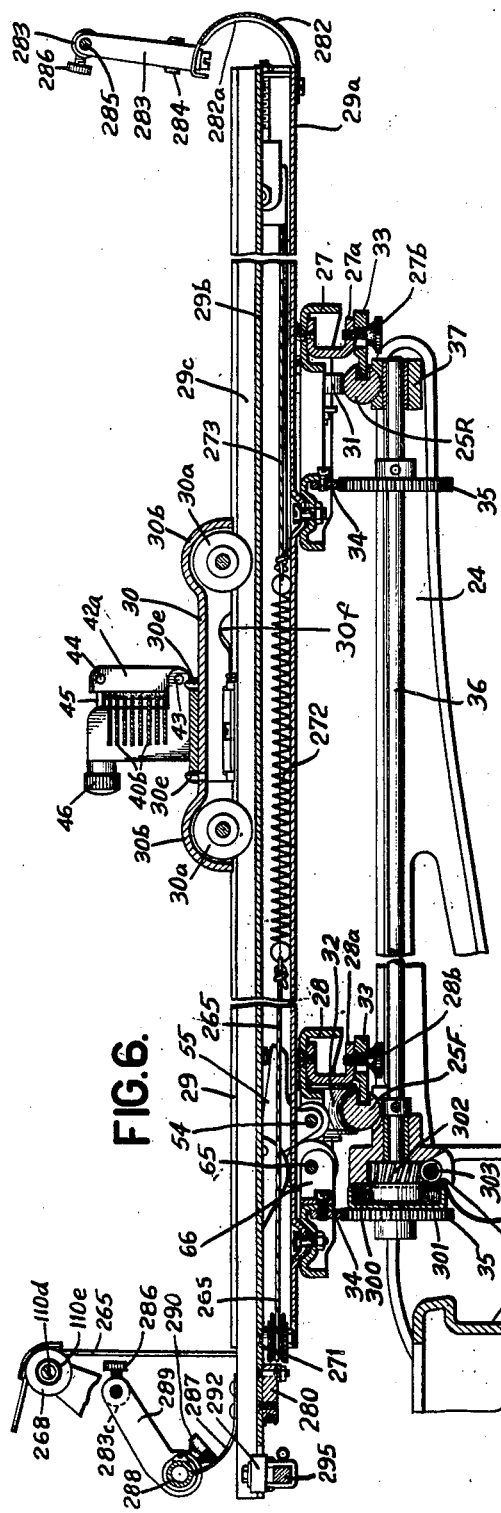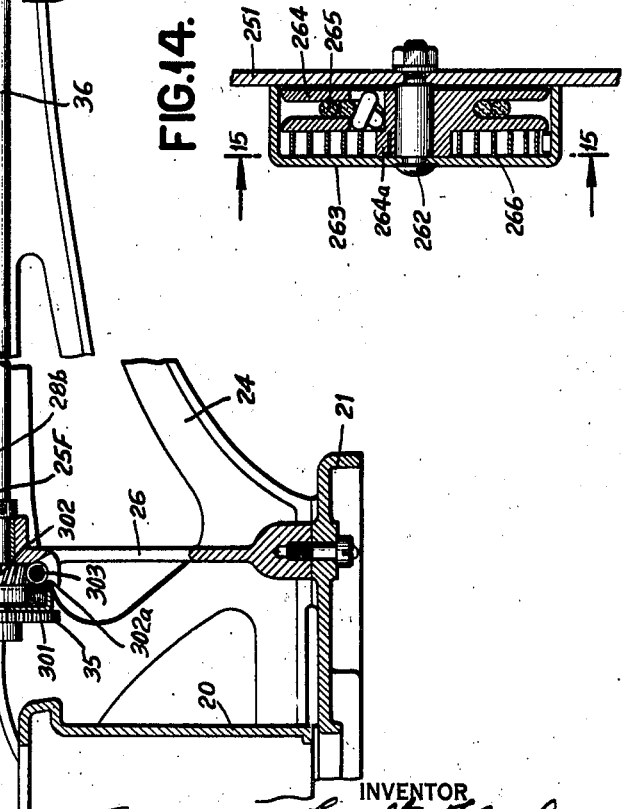

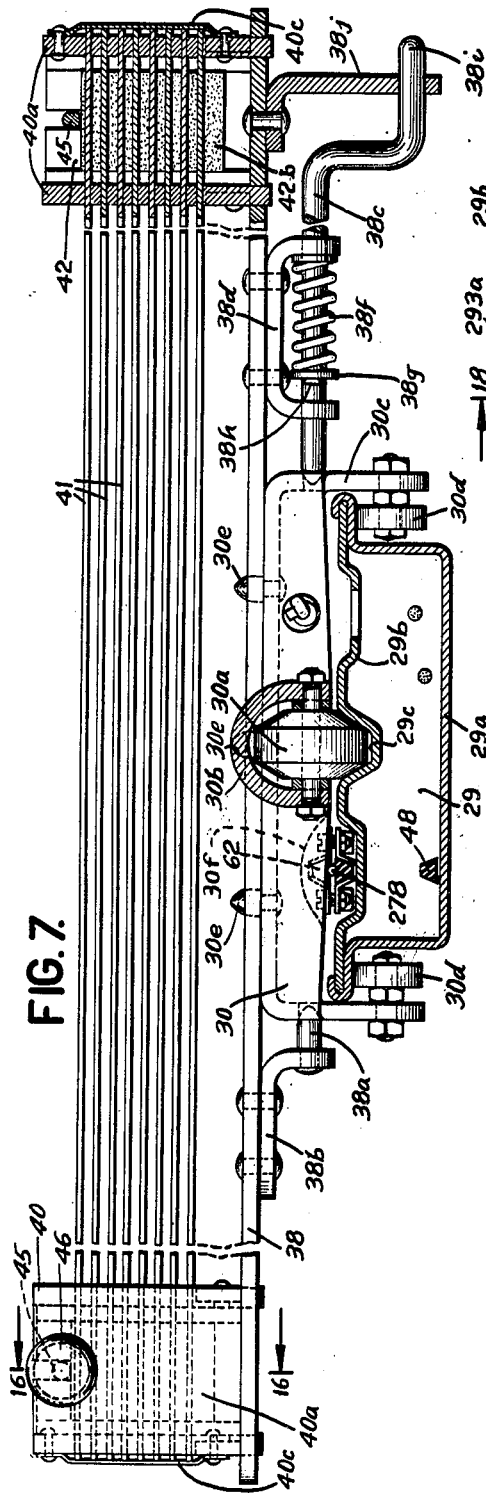

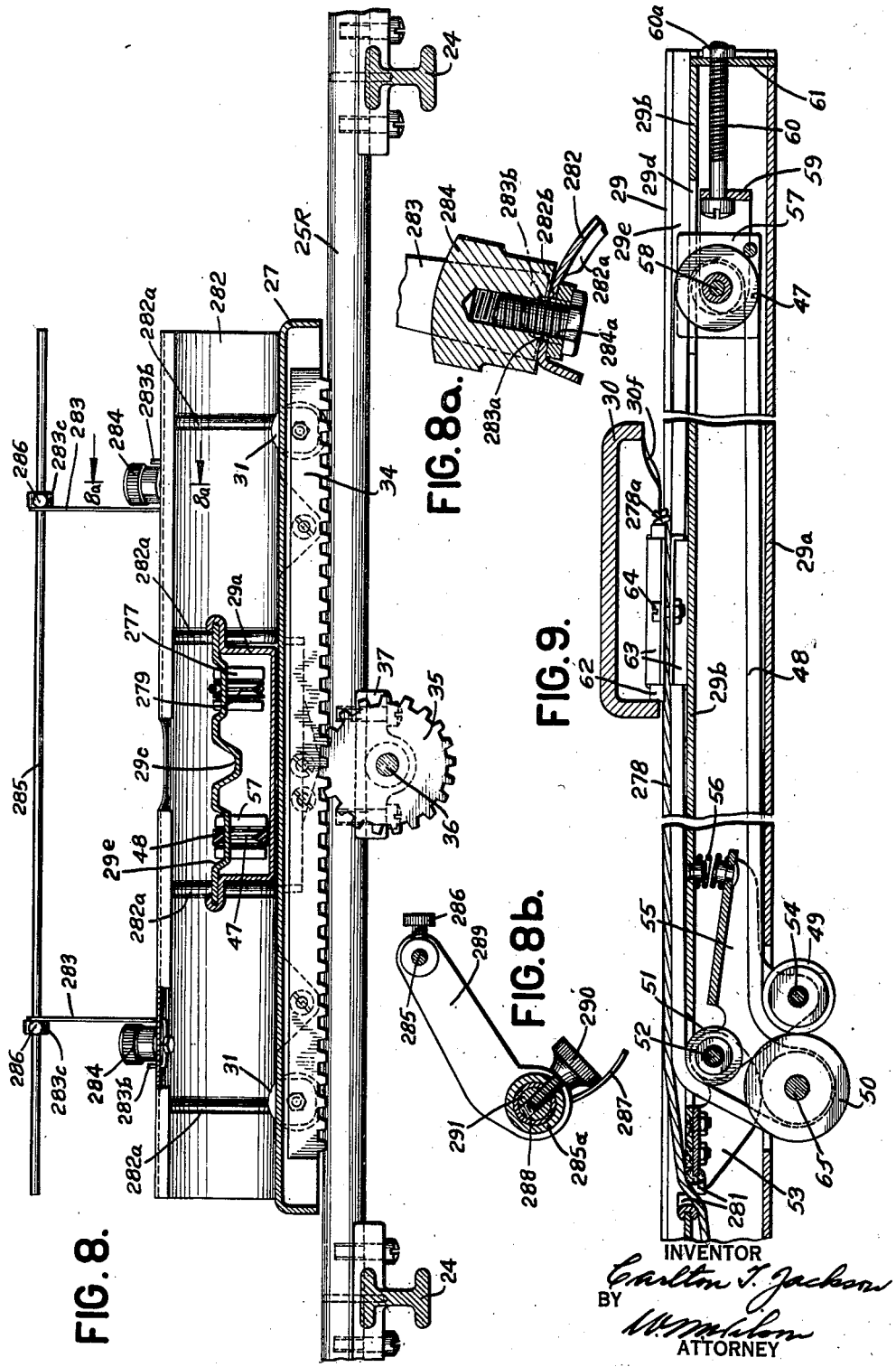

INVENTOR
Carlton T. Jackson
BY
ATTORNEY

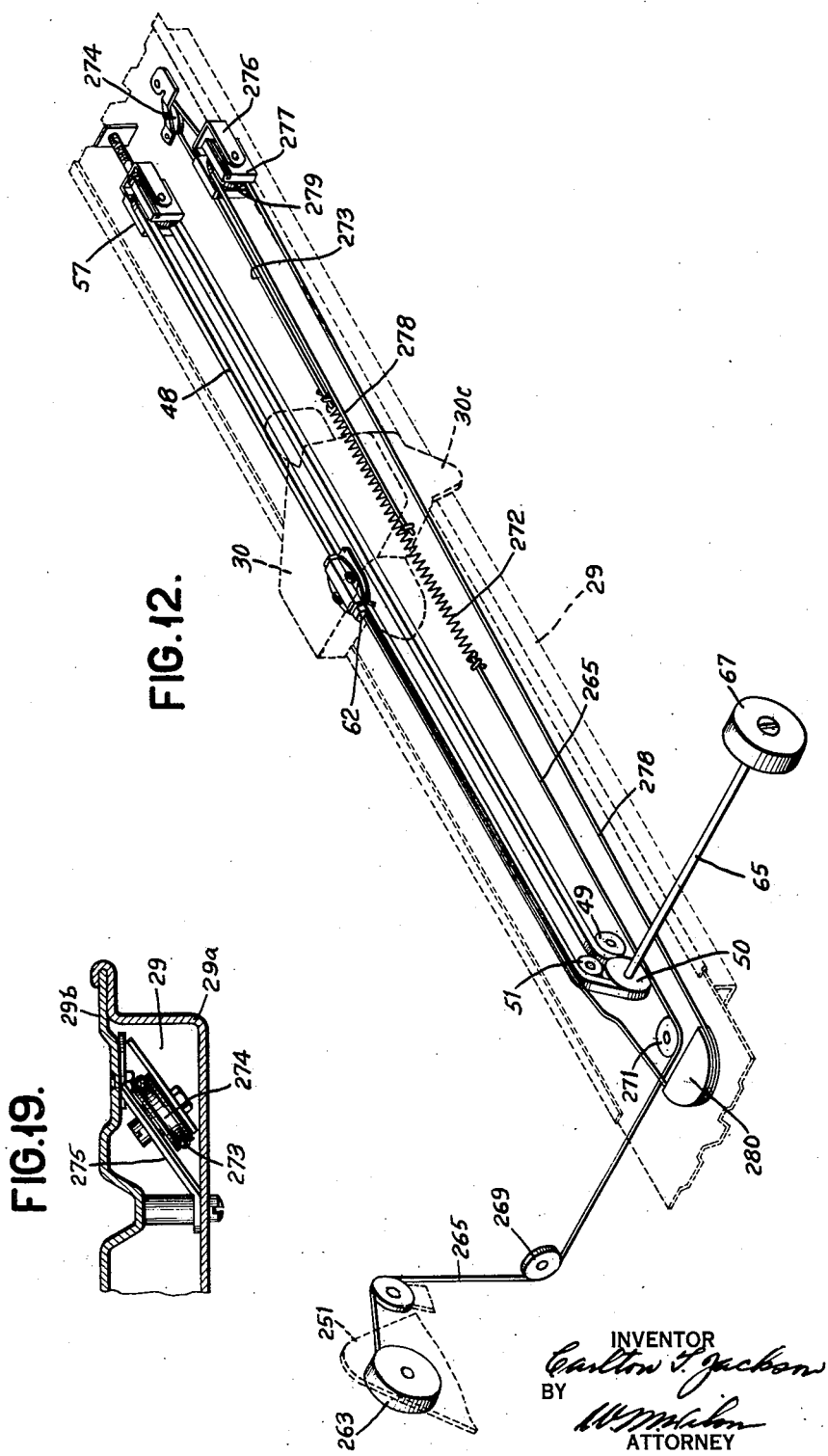

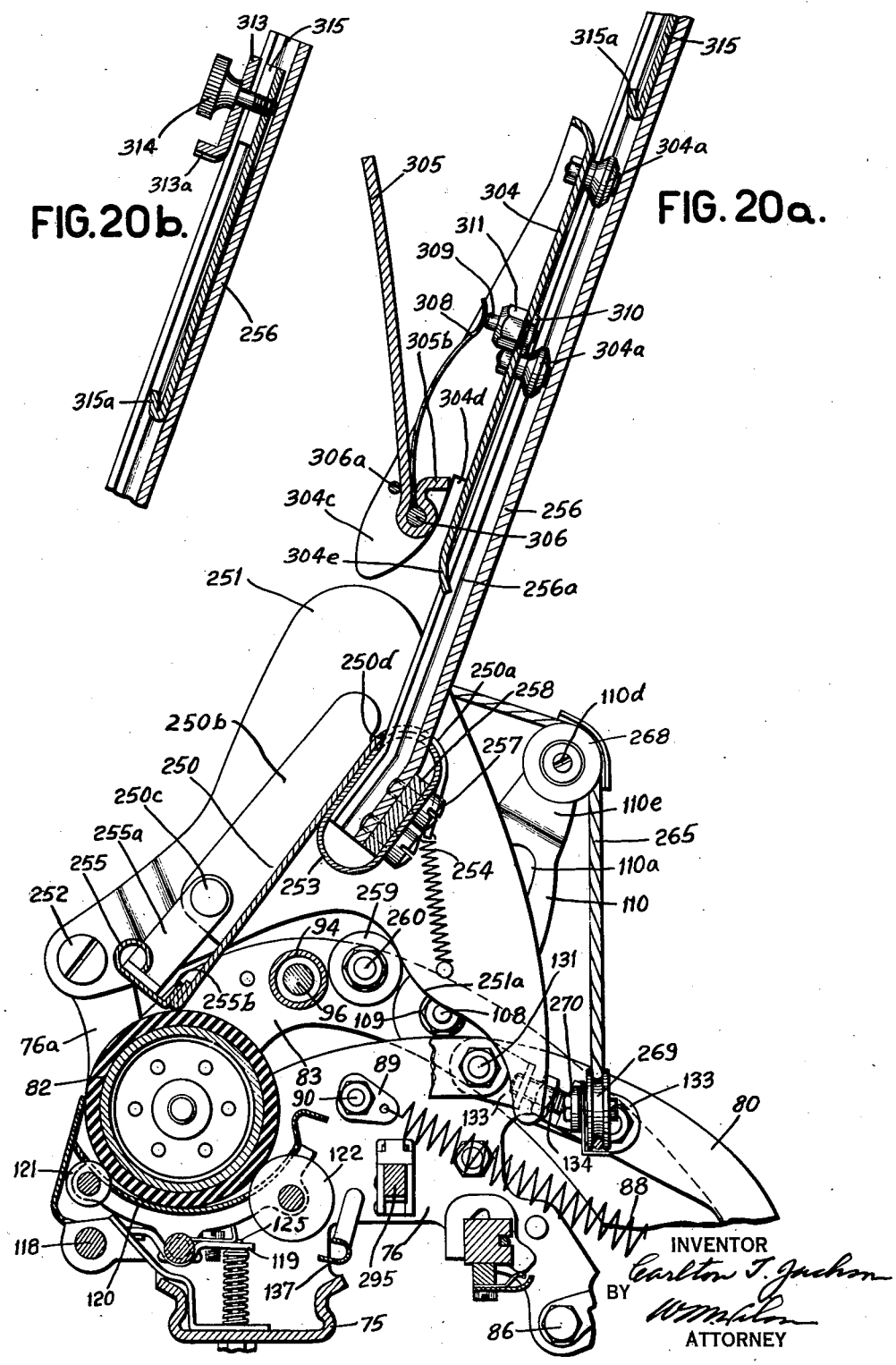

May 4, 1943.  C. T. JACKSON  2,318,314
TYPEWRITING MACHINE
Filed Sept. 16, 1939   12 Sheets-Sheet 12
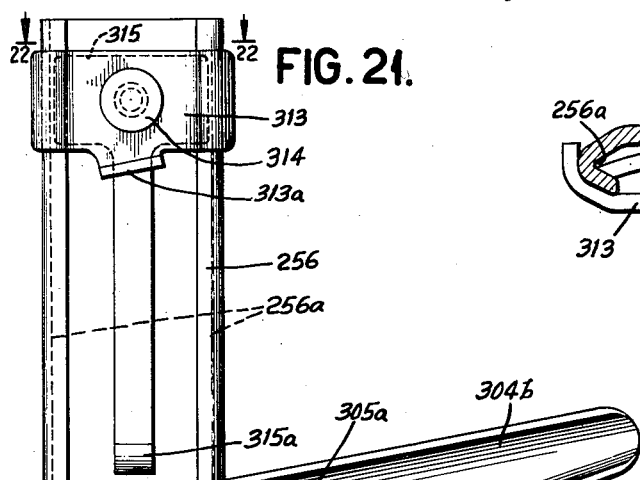
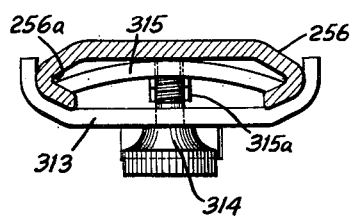
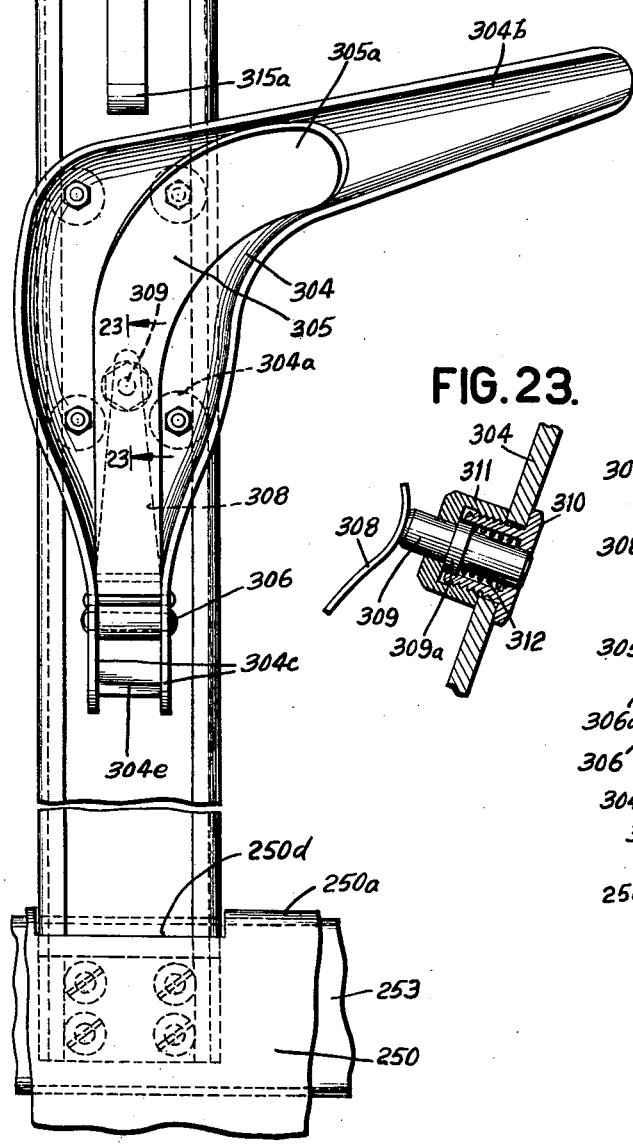
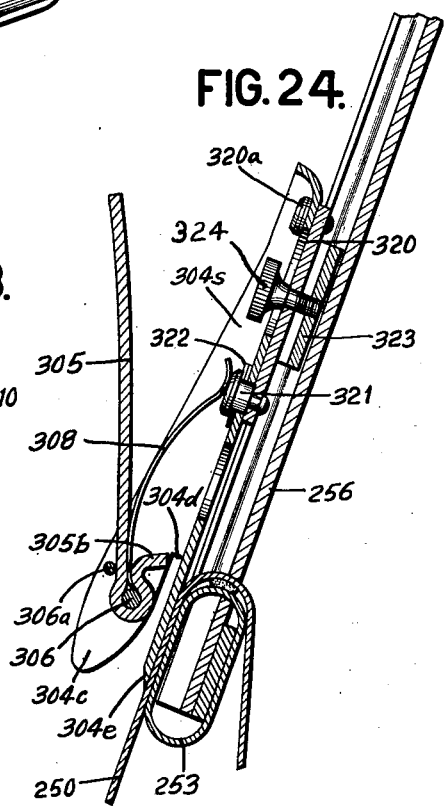
INVENTOR
Carlton T. Jackson
BY
ATTORNEY Patented May 4, 1943

2,318,314

UNITED STATES PATENT OFFICE 2,318,314

TYPEWRITING MACHINE

Carlton T. Jackson, Rochester, N. Y., assignor to International Business Machines Corporation, New York, N. Y., a corporation of New York Application September 16, 1939, Serial No. 295,222

32 Claims. (Cl. 197—126)

This invention relates to continuous billing machines.

An object of the present invention is to provide an improved billing machine of the type in which the carbon sheets are displaced from each completed set of forms to the next succeeding set of forms as soon as the typing of each set is completed whereby the carbon sheets may be used repeatedly until exhausted.

An object is to provide a billing machine in which the number of manual operations necessary to write each bill is reduced.

An object is to provide a billing machine in which the displacement of the platen, the retraction of the carbon sheets, and the restoration of the platen is effected in a single cycle of operations.

An object is to provide a billing machine in which the retraction of the carbon sheets takes place automatically whenever the platen is displaced.

An object is to provide a mechanism for displacing the platen and automatically retracting the carbon sheets which may be operated with one hand.

An object is to provide an improved leading edge gauge for continuous billing machines.

An object is to provide a leading edge gauge which is very simple in construction and very easy to manipulate.

An object is to provide an improved means for anchoring the carbon sheets in a continuous billing machine.

An object is to provide improved means for retracting the carbon sheets.

An object is to provide carbon sheet retracting mechanism which is very light and adds no appreciable load to the forms carrier or the carriage of a typewriting machine.

An object is to provide an improved stop for controlling the retraction of the carbon sheets which stop may be more conveniently adjusted by the operator.

An object is to provide improved means for removably attaching the forms carrier of a continuous billing machine to the carriage of the typewriting machine.

An object is to provide means for minimizing the effect of shock incidental to the rapid line spacing movement of the forms upon the movement of the carbon sheet anchoring truck.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is an elevation of the right-hand side of the machine.

Fig. 3 is an enlarged plan view of the platen carriage and the front end of the forms carrier.

Fig. 4 is an enlarged view of the left-hand side of the platen carriage.

Fig. 4a is a vertical section on the line 4a—4a in Fig. 3.

Fig. 5 is a view similar to Fig. 4 but shows certain of the parts in operated position.

Fig. 6 is a vertical longitudinal section through the forms carrier.

Fig. 7 is a vertical section on the line 7—7 in Fig. 1 and shows the carbon stripper carriage.

Fig. 8 is a vertical section on the line 8—8 in Fig. 1.

Fig. 8a is a vertical section on the line 8a—8a in Fig. 8.

Fig. 8b is a vertical section on line 8b—8b in Fig. 3.

Fig. 9 is a vertical section on the line 9—9 in Fig. 1.

Fig. 12 is a diagrammatic perspective view showing the system of cords and pulleys for retracting the carbon stripper carriage.

Fig. 13 is a detail view of part of the stop adjusting device for the carbon stripper carriage.

Fig. 14 is a vertical section on the line 14—14 in Fig. 4.

Fig. 15 is a section on the line 15—15 in Fig. 14.

Fig. 16 is a vertical section on the line 16—16 in Fig. 7.

Fig. 17 is a vertical section on the line 17—17 in Fig. 3.

Fig. 18 is a vertical section on the line 18—18 of Fig. 17.

Fig. 19 is a vertical section on the line 19—19 in Fig. 11.

Figure 1:
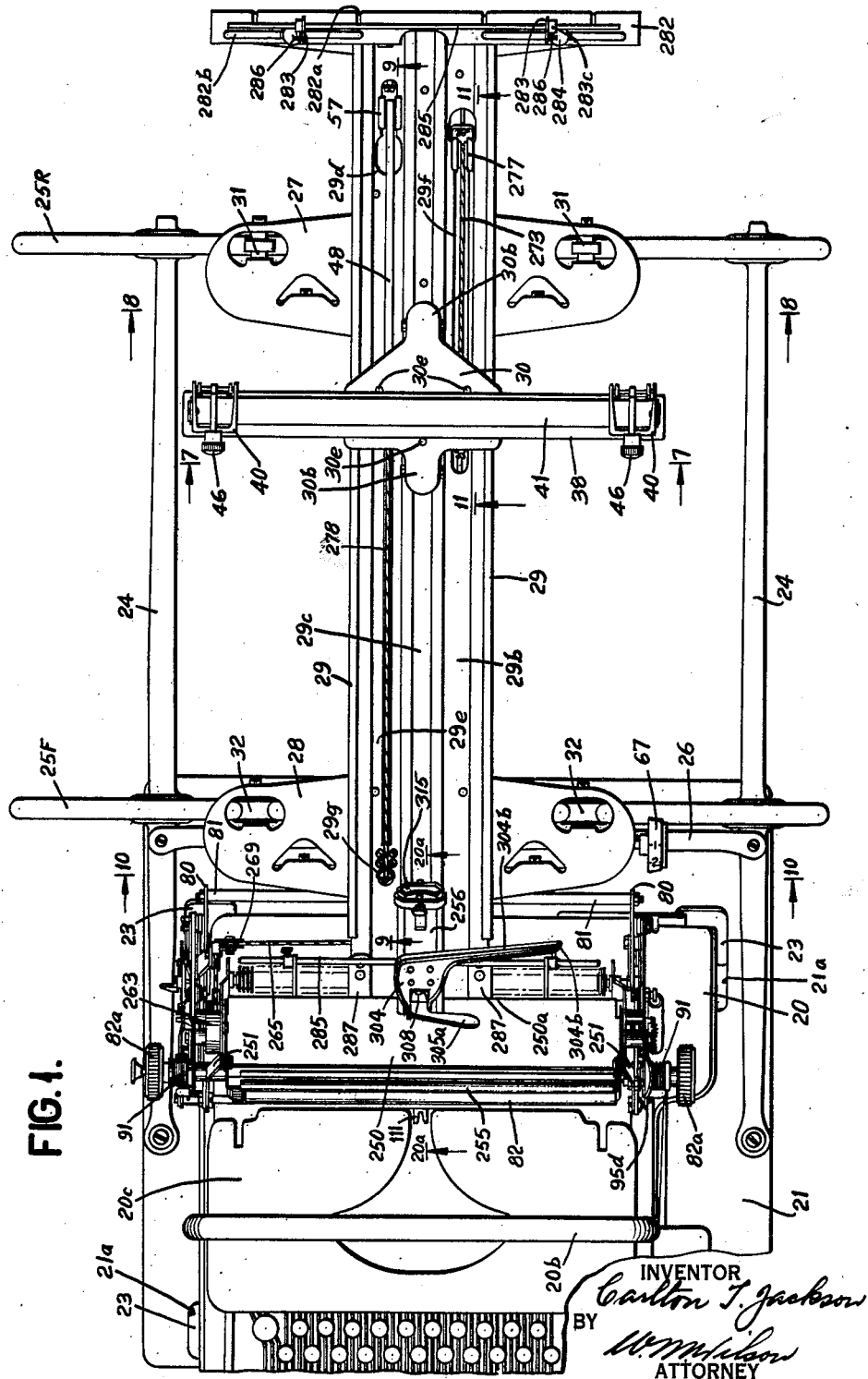
Fig. 1 is a plan view.

Figs. 20a and 20b together form a vertical section on the line 20a—20a in Fig. 1.

Fig. 21 is a front view of the paper clamp.

Fig. 22 is a section on the line 22—22 in Fig. 21.

Fig. 23 is a vertical section on the line 23—23 in Fig. 21.

Fig. 24 is a view somewhat similar to Fig. 20a showing a modification of the paper clamp useful for short forms.

In the drawings, the invention described herein is shown as applied to the well-known "International" power operated typewriter which was formerly known as the "Electromatic." It will be understood, however, that the present invention is not limited in application to either the particular form of power operated typewriter shown in the drawings or either to power operated typewriters but may be applied to wholly manually operated machines or partly manually and partly power operated machines equally as well as to a fully power operated typewriter. Since the typewriting machine disclosed in the drawings is now well known in the art, it will not be described in detail hereinafter; but only such parts thereof, such as the carriage, which are directly involved in the present invention, will be described.

Figure 10:
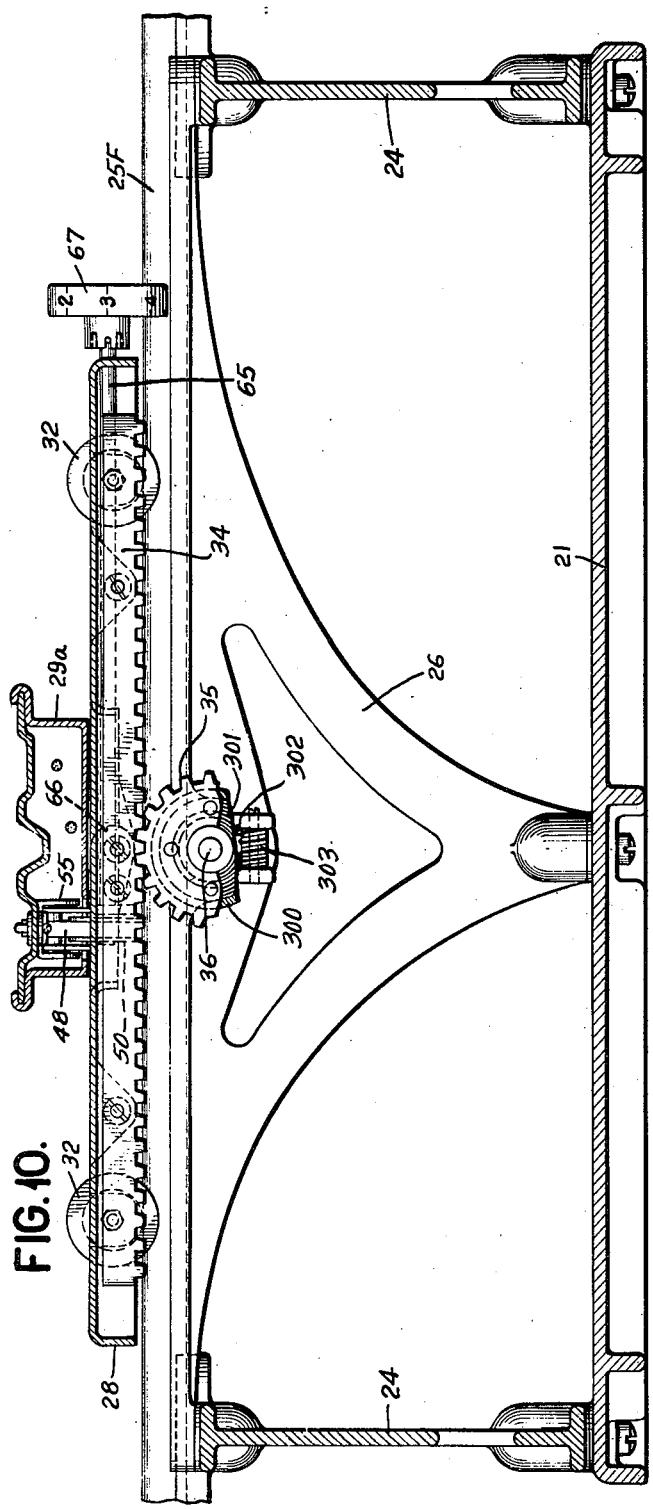
Fig. 10 is a vertical section on the line 10—10 in Fig. 1.

The numeral 20 (Figs. 1, 2, 4, 5, and 6) designates the base or main framework of the typewriter. This base 20 is placed upon a cast base plate 21 (see Fig. 10 also) which is provided with suitable recesses 21a to receive the usual feet 23 (Figs. 1 and 2) of the typewriter to prevent sliding of the base 20 on the plate 21. The latter may be properly termed the base plate for the billing machine considered as a whole and including the typewriter. Secured to the base plate 21, on the right-hand and left-hand sides of the typewriter, are the side frames 24 (Figs. 1, 2, 6, 8, and 10) which extend rearwardly of the typewriter to provide support for rails 25F, 25R which are secured to said side frames. The frames 24 are braced just in the rear of the typewriter by a transverse frame 26 which is secured to the edges of the frames 24 and also to the center of the base plate 21 near the rear edge thereof as most clearly shown in Figs. 6 and 10.

The forms carrier comprises a pair of trucks 27, 28, (Figs. 1, 2, and 6) a track 29 for the carbon stripper carriage, and the carbon stripper carriage 30. The track 29 is secured to the top surfaces of the trucks 27, 28 and slidably supports the carbon stripper carriage 30. The trucks 27, 28 are substantially identical in construction except for minor differences and are slidably mounted on the tracks 25R, 25F by means of rollers 31 (see Fig. 8 also) in the case of the truck 27 and the rollers 32 (see Fig. 10 also) in the case of the truck 28. The rollers 31 are cylindrical and make substantially a line contact with the rear rail 25R, while the rollers 32 are in the form of pulleys, the grooves of which closely conform to the front rail 25F. The purpose of this construction is to prevent the rollers 31, 32 from slipping off the rails 25R, 25F.

In order to prevent the trucks 27, 28 from being accidentally raised from the rails 25R, 25F, the latter are slotted on the rear or right-hand sides thereof as shown in Fig. 6. Secured to the trucks 27, 28 by means of brackets 27a, 28a are blocks 33 which project loosely into the groove in the associated rails 25R, 25F. In order to permit removal of the forms carrier from the rails 25R, 25F, the blocks 33 are secured to the brackets 27a, 28a by means of thumb screws 27b, 28b which pass through slots in the blocks 33 whereby the thumb screws may be loosened and the blocks moved to clear the grooves in the rails 25R, 25F.

Because of the length of the track 29 and the fact that the front end of the track is connected to the typewriter carriage in a manner to be described hereinafter so as to be moved thereby, there is a tendency for the rear end of track 29 to whip in a horizontal plane during the movement of the carriage particularly during carriage return operations when the carriage first moves with considerable speed and then is suddenly arrested. For this reason, an equalizer connection is provided to compel the trucks 27, 28 to always move identical amounts under the influence of the carriage. For this purpose, there is secured to the undersides of trucks 27, 28 racks 34 (Figs. 6, 8, and 10) which mesh with gears 35 secured to a shaft 36. The ends of the shaft 36 are journaled in a bearing provided in the transverse strut 26 and in a block 37 secured to the underside of the rail 25R near the center thereof. With this construction, whenever the truck 28 moves, the truck 27 necessarily must move an equal extent and the effect is to keep the track 29 in any given position always parallel with preceding positions.

The track 29 is formed of a channel-shaped member 29a (Fig. 7) and what may be termed a cover plate 29b. The purpose of the channel-shaped member 29a is largely to provide a rigid base for the cover plate 29b which acts as a guideway for the carbon stripper truck 30. It has been found economical to use extruded metal shapes for the channel-shaped member 29a and the cover plate 29b, these parts being cut to the proper length and assembled as best shown in Fig. 7 by folding the flanges of the channel around the edges of the cover plate 29b. This provides a rigid and strong track which is, nevertheless, very light in consequence of the thinness of the metal.

The cover plate 29b is formed with a deep central longitudinal groove 29c (Fig. 7) which acts as a guideway for rollers 30a pivoted in housings 30b formed in the carbon stripper truck 30 (Figs. 1, 2, 6, and 11). The rollers 30a are located in alignment longitudinally of the groove 29c (Fig. 1) whereby both ride in the groove and have tapered sides (Fig. 7) so as to prevent side play of truck 30 transversely of the track 29. Mounted on lugs 30c formed in the truck 30 and projecting downwardly below the solid portions of the member 29a (Figs. 2 and 7) are the rollers 30d which bear against the underside of the outwardly bent flanges formed in the member 29a so as to prevent the truck 30 from being lifted from the track 29 and also to prevent the tendency of truck 30 to rock.

Removably mounted on the truck 30 is a carbon sheet anchoring device which is most clearly shown in Figs. 6, 7 and 16, but also appears on a smaller scale in Figs. 1 and 2. This device consists of a main support bar 38 which is loosely retained in position on the top surface of the carbon stripper truck 30 by three pins 30e which are secured to said truck. The studs 30e are conically pointed to guide the bar into position between the studs when the bar is placed on the top surface of the truck. The bar 38 is releasably secured to the truck 30 by means which includes a fixed stud 38a on a bracket 38b secured to the underside of the bar 38, and a bolt 38c slidably mounted in a bracket 38d also secured to the underside of the bar 38 on the opposite side of truck 30.

Both stud 38a and the bolt 38c have conical points which engage holes formed in the sides of the truck 30. The bolt 38c is pressed toward the side of the truck 30 by means of a spring 38f interposed between the right-hand arm of the bracket 38d and a washer 38g located between the arms of the bracket 38d and prevented from sliding along the bolt 38c by means of a cotter pin 38h. The right-hand end of the bolt 38c is formed as a crank 38i which projects through a hole in a bracket 38j secured to the bar 38.

Secured to the top surface of the bar 38 at the ends thereof (Figs. 1, 2, 6, 7, and 16) are two posts 40 which are U-shaped in horizontal section. As most clearly shown in Fig. 16, the side walls 40a of the posts 40 are provided with slots 40b whereby the side walls form combs, the slots on the two posts being aligned horizontally for the reception of carbon sheet anchoring blades 41, each blade being placed in the corresponding slots of both posts as shown in Fig. 7. In order to prevent the blades 41 from becoming displaced longitudinally, the posts 40 are provided with stop plates 40c (Figs. 7 and 16) which are riveted to the outside faces of the outermost side walls 40a of the posts. The ends of the carbon sheet blades 41 extend slightly beyond the outer surface of the side walls 40a and abut the stop plates 40c which, however, do not prevent removal of the blades by sliding them rearwardly (Fig. 7) or to the right (Fig. 16).

In order to securely hold the blades 41 in the slots, each of the posts 40 is provided with a clamping device which consists of a flanged plate 42 (Fig. 16) pivoted on a short rod 43 carried by narrow extensions of the side walls 40a beyond the rear edge of the bar 38. The flanges 42a on each plate 42 extend vertically from the extensions of the side walls 40a in order to impart stiffness to the plate 42 and also to provide for the pivot holes for the rods 43.

Secured in holes formed in the extreme upper ends of the flanges 42a of each post 40 is a cross rod 44 (Figs. 7 and 16) which passes through the eye of an eye bolt 45, the threaded end of which is provided with a thumb nut 46. Both the upper edge of plate 42 and the upper edge of front wall 40a of each post 40 are provided with short vertical slots for loosely receiving the shank of the bolt 45. The front face of each plate 42 is provided with a pad 42b of resilient material, preferably rubber or leather.

After the proper number of blades 41 have been placed in the slots 40b with plate 42 in the position shown by the dotted line of Fig. 16, the plates 42 may be drawn forwardly, that is rotated counterclockwise in Fig. 16, by pulling on the thumb screw 46. Then the shanks of the eye bolts 45 may be lowered into the slots in the front walls of the posts 40, and the thumb screws turned to clamp the blades firmly in the slots 40b, as shown by solid lines in Fig. 16.

In order to limit the rearward movement of the truck 30 to retract the carbon sheets, there is provided an adjustable stop which may be manipulated by the operator at the front end of the track 29. The stop and its operating mechanism is shown in Figs. 1, 2, 7, 9, 10, and 12. With particular reference to Fig. 9, there is shown mounted in the space between cover plate 29b and the channel plate 29a, pulley 47 around which runs the belt 48. Near the front end of the track 29, that is, the left-hand end in Fig. 9, the lower stretch of belt 48 runs around the tensioning pulley 49 and the pulleys 50, 51. The pulley 51 is journaled on a pin 52 carried by a bracket 53 fixed to the underside of the cover plate 29b. The pulley 49 is mounted on a pin 54 carried by a U-shaped member 55 which is also pivoted on the pin 52. The member 55 is urged clockwise (Fig. 9) by means of a spring 56 which is centered by means of pilot studs attached to the member 55 and to the underside of cover plate 29b, respectively.

In order to adjust the tension of the belt 48, the pulley 47 is part of a sheave movably mounted on cover plate 29b. This sheave includes two blocks 57 having their sides slotted to receive the edges of the straight portions of a keyhole slot 29d provided in cover plate 29b near its rear end. The larger portion of slot 29d permits the belt 48 to pass over the top of the cover plate as shown in Figs. 1, 7, 8, and 9 and also permits assembly of the sheave. In order to accommodate the belt 48, the cover plate 29b is formed with a channel 29e like the channel 29c deep enough to provide clearance for the truck 30. Pivoted on a pin 58 which supports the pulley 47 between the blocks 57 is a U-shaped stirrup 59 (Fig. 9) having a hole for the shank of a fillester-head screw 60. The threaded portion of the screw 60 extends through a plate 61 secured to the rear ends of the channel shaped member 29a and the cover plate 29b and the screw is provided with a nut 60a which may be turned to apply tension to the belt 48. Near the front end of the track 29 the channel shaped member 29a and the cover plate 29b are provided with suitable openings to permit the belt 48 to pass around the pulleys 49, 50, 51, respectively.

Secured to the upper stretch of the belt 48 is a stop member 62 which is most clearly shown in Figs. 7 and 9. This stop member comprises a short strip of resilient material which conveniently may be a section of belting similar in cross sectional shape to the belt 48. The stop member 62 is placed with its wider face confronting the wider face of the belt 48 and clamped thereto by means of the channel shaped clamp members 63. The latter are brought together by means of two bolts 64 located near the center of the longer edges of the member 63. The members 63 are shaped in transverse sections as shown in Fig. 7 to conform to the trapezoidal shape of the belt 48 and stop member 62.

The pulley 50 is fixed to a shaft 65 (Figs. 6, 9, and 10) the left-hand end (Fig. 10) of which is journaled in the front truck 28 by means of a bracket 66 mounted on the rack 34 associated with the same truck 28. The right-hand end (Fig. 10) of shaft 65 passes through a hole in truck 28 and, as most clearly shown in Fig. 13, is provided with a thumb wheel 67. The latter is mounted on the shaft 65 but is prevented from rotating with respect to the shaft in consequence of a pin 68 fixed in a hole in the shaft and loose in a slot extending transversely of the hub of the thumb wheel 67. The thumb wheel 67 is spring urged against the pin 68 by means of a spring 69 located in a recess formed in the hub of the thumb wheel and abutting the head of a screw 70. Also registering with the slot in the hub of the front wheel 67 is a stud 71 mounted on the truck 28.

The periphery of the thumb wheel 67 is provided with numerals 1 to 6 equally spaced of which the numerals 3 to 6 may coincide with the ends of the slot in the hub, while the other four numerals may be located in pairs intermediate the ends of the slot. Coincidental with these latter numerals are four holes which are equally spaced between the ends of the slots whereby the slot and said holes define six fixed positions of the thumb wheel 67. The holes in the hub of thumb wheel 67 are located to register with the stud 71 whereby the thumb wheel may be locked in any one of six positions designated by the numerals on the periphery of the thumb wheel. When it becomes necessary to re-adjust the stop 62, as will be the case whenever used portions of the carbon sheets have been torn from the unused portions, the thumb wheel 67 may be grasped and pulled to the right (Fig. 13) far enough to disengage the stud 71 from the particular hole or portion of the slot with which it is registered and rotated far enough to move the stop 62 the required distance toward the operator, or to the left in Fig. 9. The thumb wheel 67 may then be released and permitted to re-enter one of the holes or the slot therein. In order to obtain the maximum possible retracting movement of truck 30, the rear side thereof is cut away as shown in Fig. 9 as 30f to permit the stop to strike the front wall of truck 30.

The carriage comprises a channel-shaped member 75 (Figs. 4, 5, and 18) and end plates 76, 77 secured to the ends of said member. The channel-shaped member 75 is formed with two grooves in which ride anti-friction roller trucks 78 (Figs. 2, 4, and 5) by means of which the carriage is movably supported on the front rail 79F and the rear rail 79R of the typewriting machine. The carriage also includes extension plates 80 which are secured to plates 76, 77 and rigidly joined together by means of a cross rod 81.

The platen is generally designated 82 in Figs. 1, 3, 4, and 20a and is rotatably mounted in arms 83 (Figs. 2 to 5, and 20a) which are pivotally connected by studs 84 to short arms 85. The latter are pivotally mounted on the extension plates 80 by means of studs 86 riveted to arms 85. The studs 86 extend through holes in plates 80 and the shanks of the studs are flattened slightly to receive oblong holes in arms 87 (Figs. 4a and 5) whereby the arms 85, 87 are keyed together on opposite sides of the plates 80. Attached to the arms 87 are springs 88 (Figs. 4a, 5, and 20a) which are anchored to plates 89 on studs 90 whereby the arms 85 tend to rock forwardly, that is, clockwise in Fig. 4 or counterclockwise in Fig. 4a, so as to tend to press arms 83 to the right in Fig. 4.

The platen is detachably journaled upon the arms 83 by means of sleeves 91 (Figs. 3 and 4) which are circumferentially grooved to enable the sleeves to be more readily grasped by the operator and moved axially of the platen toward the usual platen rotating knobs 82a. The sleeves 91 each have a shouldered portion 91a which fits in an open ended partly circular slot 83a (Fig. 4) formed in the adjacent arm 83. The open ends of the slots are large enough to permit the free passage of the portions 82b of the platen on which sleeves 91 are slidably mounted; but are not large enough to permit disengagement of the shouldered portions 91a from slots 83a except by movement of sleeves 91 axially of the portions 82b and away from arms 83. Such movement of the sleeves 91 is prevented when the platen is in place by plates 92 secured to the sides of the sleeves by means of screws 93 (Fig. 4). Each plate 92 has two lugs 92a located on opposite corners of the end of the plate nearest the adjacent arm 83 and the narrower part of the plate loosely fits the edges of the reduced portion of the slot 83a as shown in Fig. 4 so as to normally prevent movement of the sleeve 91.

When it is desired to remove the platen, the screws 93 are loosened with a screw driver, with the platen in the position of Fig. 5, sufficiently to permit the plates 92 to move radially of the portions 82b far enough for lugs 92a to clear the edges of the arms 83 and then sleeves 91 may be moved toward the platen rotating knobs 82a to disengage the shouldered portions 91a from slots 83a and permit the platen to be detached from said arms by sliding it downwardly and to the left.

This feature of removability of the platen is a distinct advantage in continuous billing machines as requirements of users of the machine in respect to the number of manifold copies frequently make it necessary to remove the platen and substitute different sizes according to the number of manifold copies desired. It is often necessary to substitute a platen having a smaller diameter to accommodate a thicker pack of work sheets with interleaved carbons. For ordinary correspondence work and work requiring only a few carbon copies, a standard platen is satisfactory as the feed rolls can yield enough to accommodate a moderately thick pack, but, where a very large number of carbon copies is required, the paper deflector and feed rolls cannot yield enough to accommodate the thick pack of work sheets and still latch in typing position properly and it is necessary to use a platen of smaller diameter.

The arms 83 are integrally joined together by means of a tube 94 (Figs. 3 and 20a) and latched in normal position by means of a pair of latches 95 (Figs. 2 to 5) secured to a rod 96, the rod being pivotally mounted in the arms 83 and extending through the tube 94. The latches 95 are located outside of the arms 83 and engage offset lugs 97a (Figs. 4 and 5) of latch plates 97 adjustably secured to the sides of end plates 76, 77 of the carriage by means of bolts 98.

The platen is raised automatically by means of a spring 99 (Fig. 3) located on the right-hand side of the carriage end plate 77. The spring 99 is located in the bore of a tube 100 which is pivoted at its lower end of the end plate 77 and acts upon a piston rod 101. The latter works in the bore of the tube and is pivoted to the right-hand arm 83. This spring 99, by pushing the piston rod 101 upwardly, constantly tends to rock the arms 83 in a clockwise direction (Fig. 2) or in a counterclockwise direction (Figs. 4 and 5). However, movement of the platen will normally be prevented by virtue of the latches 95 engaging the latch lugs 97a.

When the paper table is operated after the typing of a form has been completed, the latches 95 are automatically released in a manner which will be made clear hereinafter. The raising of the platen renders effective certain mechanism about to be described for controlling the operation of the usual pressure rollers which cooperate with the platen to hold a work sheet thereon and to feed same. This mechanism is shown in Figs. 4 and 5 and is similar to mechanism disclosed in Patent No. 2,230,677. Associated with this mechanism is latching means to hold the platen latches 95 in released position in order to reduce the effort required to restore the platen to the latching position, since the forces exerted by the springs 88 and 99 must be overcome besides the frictional force exerted by the latching portions of latches 95 upon the lugs 97a. Ordinarily the springs 88 are just strong enough to balance the weight of the platen and other parts carried by the arms 83, and it has been found necessary to supplement the force exerted by the springs 88 with the spring 99 in order to insure that the platen will be raised quickly when the latches are released. As the platen rises, the leverage of arms 87 becomes more favorable whereby springs 88 contribute their quota to the force required to lift the platen.

After the platen has been raised an extent sufficient for the latches 95 to clear the lugs 97a a latch lever 104 (Figs. 3, 4, and 5) becomes effective to hold the latches in disengaged position. The lever 104 is formed with two arms with the upper arm provided with a bent over lug 104a in the plane of a finger 95a formed in the left-hand latch 95. The lower arm 104b is bent inwardly and extends forwardly, or to the right in Fig. 4, behind the left-hand latch 95 and normally rests upon the lug 97a, being held against said lug by means of a spring 105 anchored to a pin 106 and to a pin on the upper arm of the latch lever 104. A spring 107 which is anchored to pin 106 and to the left-hand latch 95, holds latches 95 in the latching position.

Bearing in mind that the latches 95 are initially rotated in a counterclockwise direction (Fig. 4) to disengage the latches from the lugs 97a before movement of the platen takes place, the subsequent movement of the platen will permit the lever 104 to rock in a clockwise direction relative to the left-hand arm 83 whereby lug 104a assumes a position in front of the latch finger 95a thereby holding the latches 95 in released position as in Fig. 5. The lever 104 is so proportioned that when the platen is lowered to the position of Fig. 4, the lug 104a will be gradually withdrawn from engagement with the latch finger 95a as the platen approaches the position of Fig. 4, owing to the eventual engagement of the lower arm 104b of lever 104 with the lug 97a.

The latch lever 104 is pivoted upon a stud 108 carried by the left-hand arm 83. The right-hand arm 83 carries the similar stud 108 in the same position and on both of these studs are mounted rollers 109 (Figs. 4a and 20a). The rollers 109 engage the walls of curved slots 110a in slotted plates 110 (Figs. 2 to 5) which are adjustably secured to the outside faces of carriage end plates 76, 77 and extension 80. The slots 110a are so shaped that the axis of the platen generates an irregular curve in its upward movement whereby the platen follows the path shown by the dot and dash lines in Fig. 5.

It is desired that the platen be raised to a position almost directly above its normal position. Owing to the fact that the usual type guide 111 shown in Figs. 1, 4, and 5 will obstruct movement of the platen if it follows a strictly vertical path, it is desirable that the platen first move rearwardly and on an upward slant to the left (Fig. 5) and then move nearly vertically. For this purpose, the cam slots 110a are given the curved shape most clearly shown in Figs. 4 and 5.

It was stated above that, in restoring the platen to typing position, the platen has to push down the usual paper deflector and feed roller assembly. Since fairly stiff springs must be provided to actuate the feed rollers into engagement with the platen to securely hold the work sheets against the platen, the force necessary to overcome the spring pressure of restoring the platen is quite strong and would require considerable effort by the operator. Means are provided to enable the paper deflector and feed roller assembly to be depressed slightly below normal position in advance of the platen with little effort. This means consists of a lever system operated by one of the platen supporting arms 83 for actuating the paper deflector and feed roller assembly. The lever system is so arranged as to require only a small force exerted over a relatively much longer period during the descent of the platen than the period required during the ascent of the platen to disengage the platen from the feed roller and paper deflector assembly. The mechanical advantage of this lever system is one of force with a high leverage ratio during the descent of the platen whereby a large movement of the platen and the expenditure of little force is required to restore the paper deflector and feed roller assembly to normal position.

Pivoted on the stud 108 carried by the left-hand arm 83 (Figs. 4 and 5) is a lever 112 having a pin 112a overlying an arm 95c on the left-hand latch 95. The lever 112 is normally held in the position of Fig. 4, with the pin 112a resting upon the arm 95c by a spring 113 anchored to pins carried by the lever 112 and arm 83, respectively. It is apparent that the initial rocking movement of the latches 95 will also rock the lever 112 in a counterclockwise direction relative to arm 83 from the position of Fig. 4 to the position shown in Fig. 5.

Pivotally mounted on a stud 114 (Figs. 4 and 5) carried by arm 83 is an arm 115 having a pin 115a in the plane of the lower end of lever 112. A spring 116 connected to pins carried by the lever 112 and arm 115, respectively, tends to urge the pin 115a into contact with the lever 112 whereby, when the lever 112 is rocked to the position of Fig. 5, the arm 115 tends to follow the movement of said lever. The right-hand edge of the arm 115 is formed as an arc of a circle and is in the plane of a lug 117a formed in an arm 117 secured to a cross shaft 118 (Figs. 3 and 20a) which is journaled in the carriage end plates 76, 77. The shaft 118 extends the full length of the platen between the end plates 76, 77 and has secured to it an arm 119 (Figs 3, 4, 5, and 20a). This arm is located at substantially the mid-point of the shaft 118 and universally rockably supports the paper deflector 120 which is a partly cylindrical sheet metal plate on which are mounted the front pressure rollers 121 and the rear pressure rollers 122.

Screwed into a hole in the channel-shaped member 75 at substantially the middle of the carriage and underneath the end of the arm 119, is a sleeve 123 (Figs. 4, 5, and 20a) having a shoulder for seating the lower end of the coil spring 124. The upper end of the coil spring 124 is seated on a shoulder formed in a plunger 125 having a reduced portion at its upper end loosely projecting into a hole in the end of the arm 119. The paper deflector 120 is thus universally pivotally mounted near its mid-point on the arm 119 and the spring 124, acting on the plunger 125, tends to press the paper deflector 120 and pressure rollers 121, 122 upwardly against the underside of the platen to cooperate therewith to feed work sheets.

When the platen is raised, the spring 124, exerting pressure on the arm 119, causes the pressure rollers 121, 122 and paper deflector 120 to follow the platen a limited extent. The preliminary movement of the latches 95 results in moving the lever 112 to the position of Fig. 5. This brings the arm 115 into contact with the lug 117a which prevents further movement of the arm 115, but lever 112 can move a further extent owing to the fact that such lever and arm 115 are yieldingly interconnected by the spring 116. Thus, the first movement of the lever 112 places the spring 116 under greater tension. As the platen rises to the non-typing position of Fig. 5, in consequence of further movement of the lever 112 after releasing the latches 95, the circular edge of arm 115 wipes over the lug 117a. Before the platen reaches the position of Fig. 5, however, the end of arm 115 rides off the lug 117a and snaps to the position of Fig. 5 with the pin 115a again engaging the lower end of lever 112.

Referring now to Fig. 5, as the platen descends to typing position, the lower end of arm 115 swings in a short arc to assume a position over the lug 117a. With continued downward movement of the platen to its typing position, the arm 115, pressing on the top of the lug 117a, rocks the arm 117 downwardly or counterclockwise (Fig. 5) and thereby causes the paper deflector 120 and the feed rollers 121, 122 carried thereby to become lowered in advance of the platen. The parts are so proportioned that when the platen is a little below its latching position, the end of arm 115 rides off the lug 117a and permits the spring 124 to rock the arms 117, 119 back to the position of Fig. 4.

The arm 115 is made of such length that the pressure rollers 121, 122 are moved a little below their normal position before arm 117 is released whereby, even with a thick pack of forms, the pressure rollers 121, 122 do not actually press the forms in firm contact with the platen until the platen is in its normal or typing position. Thus, during the descent of the platen, there is little resistance offered to its movement and the restoring movement is very easy and positive.

The rear or left-hand end (Figs. 4 and 5) of the arm 117 has an arcuate slot through which projects a stud 126. Rotatably mounted on the stud 126 is a release lever 127 having a notch 127a in which is located a roller carried by a stud 117b on the arm 117. The lever 127 adjacent the notch 127a is formed as a cam 127b. When the release lever 127 is rocked in a counterclockwise direction (Fig. 4) the cam 127b, coacting with the roller on the stud 117b, depresses the arm 117 and thereby disengages the pressure rollers 21, 22 from the platen to permit work sheets wrapped around the platen to be straightened. Counterclockwise movement of the lever 127 is limited by a projecting part 127c of said lever by engagement with the roller on the stud 117b. Adjacent the projection 127c the edge of the lever 127 is straight in a plane at right angles to a line drawn through the centers of studs 117b, 126 whereby the lever is yieldingly held in displaced position and has no tendency to rotate in either direction when the pressure rollers are released. Secured to the outer end of the stud 126 is a spring plate 126a having a depressed portion 126b embossed thereon and engaging a shallow depression in the side of lever 127 to yieldingly hold said lever in the position of Fig. 4.

Clockwise movement of lever 127 from the position of Fig. 4 is prevented by the shape of the notch 127a which is such as to cause the lever 127 to press on the roller carried by stud 117b in a direction radial of shaft 118. Thus the roller carried by arm 117 operates as a limit stop for lever 127.

While the platen is being lowered from the position of Fig. 5, the lever 127 will be held against clockwise movement until the arm 115 has engaged lug 117a and moved the arm 117 downwardly far enough for the roller carried by stud 117b to be moved out of the notch 127a in the lever 127. Unless means were provided to prevent such action, it might be possible to accidentally displace the lever 127 in a clockwise direction during the time that the arm 117 is descending. Owing to the shape of the lever 127, if such action occurred, said lever might prevent the full restoration of the arm 117 to the position of Fig. 4. The means to prevent the lever 127 from being moved in a clockwise direction from the position of Fig. 4 while the arm is descending consists of a lug 117c formed in the arm 117. It is apparent in Fig. 4 that, after the arm 117 has moved downwardly a small amount, the lug 127c will be positioned in the plane of the lever 127 and prevent said lever from being rocked in a clockwise direction while the lever 117 is depressed below its normal position. It would, of course, be possible to place a stop pin on the carriage end plate 76 in the plane of lever 127 but this would entail extra parts and an additional assembly operation besides requiring that a hole be drilled in the end plate 76. By forming the lug 117c on the arm 117 the cost of the mechanism is very materially reduced.

The arm 117 is not rigidly connected to the shaft 118 but is adjustably attached thereto by means including a screw stud 118a (Figs. 4 and 5). Secured on the shaft 118 adjacent the arm 117 is an arm 129 having an arcuate slot through which passes a bolt 130 by means of which the arm 129 is adjustably clamped to the arm 117. This provides a means of adjusting the extent to which the pressure rollers 121, 122 are depressed during the return stroke of the platen.

Means are provided to adjust the platen 82 horizontally at right angles to its longitudinal axis. This adjusting means is best shown in Fig. 4a and consists of separate means for adjustably moving each plate 110 in a more or less horizontal direction relative to the end plates 76, 77 and extension plates 80 of the carriage. Each plate 110 (Figs. 4a and 20a) is attached to the end plates 76, 77 and to the associated extension plate 80 by means of a common fixed bolt 131, and to plate 80 alone by a second bolt 132. The plates 110 are slotted as indicated by reference numeral 110b in Fig. 5 while the extension plates 80 are slotted at 80a (Fig. 4a). Each bolt 131 closely fits the holes in the plates 76, 77, 80 and loosely, slidably fits slot 110b through which it passes. Similarly, the bolt 132 closely fits the hole in plate 110 and slidably fits slot 80a. Two brackets 133 (Figs. 4a and 20a) having holes closely fitting the bolts 131, 132 respectively, have their bent-over portions provided with threaded holes confronting each other. The hole in one of the brackets 133 is provided with a right-hand thread while the hole in the other bracket is provided with a left-hand thread. Into these holes is screwed the shanks of a double ended hexagonal stud 134 having right and left-hand threads. By loosening the bolts 131, 132 and turning the studs 134 in one direction or the other, the plates 110 may be adjusted longitudinally of a line drawn through the centers of the bolts 131, 132. Owing to the inaccessibility of the head of the bolt the plates 110 are slotted as most clearly indicated by reference numeral 110c in Fig. 5, whereby the head of each bolt 131 is capable of a sliding movement in the slot 110c of plate 110 but is prevented from turning.

The reference numeral 135 (Figs. 3, 4, and 5) designates the usual carriage release lever of which there is one at each end of the carriage. This lever is pivoted on the stud 136 and engages a bail 137 pivoted in the plates. The bail 137 actuates the escapement dog release lever 138 pivoted on the top of the rear rail 79R.

The reference numeral 139 designates the usual line space control lever by means of which the line space mechanism may be set to rotate the platen one, two or three spaces.

The machine is provided with a paper table which is located on the delivery side of the platen so as to support the leading portions of the forms while they are being typed. The paper table is designated 250 (Figs. 1, 2, 3, 5, 20a, and 24) and is located between the side plates 251 as best shown in Figs. 3, 4, 5, and 20a. The plates 251 are pivoted on arms 76a, 77a which are formed as extensions of the plates 76, 77 by means of studs 252. The plates 251 are rigidly secured together above and in the rear of the platen by means of a tubular member 253 which is oval in section with flat sides.

The paper table 250 is pivotally mounted on the tubular member 253 and for this purpose it is provided with a rolled edge generally designated 250a to conform to the upper edge of the tubular member 253. Anchored at the terminus of the rolled edge 250a adjacent the plates 251 are springs 254 which are also anchored to pins carried by the plates 251. These springs not only firmly hold the paper table on tubular member 253, but also tend to rotate the paper table in a clockwise direction (Fig. 20a) and thus oppose any tendency to rotate the paper table 250 in a counterclockwise direction. Normally the paper table 250 is held by the springs 254 with one flat side of the member 253 contacting with the rear surface of the paper table 250 adjacent the rolled portion 250a.

The ends of the paper table 250 are provided with flanges 250b (Figs. 3 and 20a) to provide support for a forms severing knife generally designated 255. The forms severing knife is formed as a bail of which the side arms 255a are pivoted on studs 250c on the flanges 250b. The tearing knife 255 is formed with a flange 255b which is parallel with the front surface of the paper table 250 along the edge nearest the platen as best shown in Fig. 20a. The edge of the flange 255b is formed with a bevel which may be notched at intervals to increase the effectiveness of the knife to sever the forms from each other.

Associated with the paper table 250 is a combination paper clamp and leading edge gauge which is movably mounted on the framework comprising the plates 251 and the tubular member 253. This clamp enables the forms to be drawn forwardly, that is, toward the operator, a uniform extent determined by an adjustable stop forming part of the leading edge gauge. Secured to the tubular member 253 (Figs. 1, 20a and 21), near the center of the tubular member, is a track member 256 (see Fig. 2 also) on which the paper clamp is movably mounted. The lower end of the track member passes through a cut-away portion 250d in the rolled edge 250a of the paper table and through an opening in the tubular member 253 into the interior of the member 253, and is secured to said member by means of screws 257 and a spacing block 258.

The raising of the platen to the non-typing position and the retraction of the carbon sheets is effected by rotating the paper table frame, comprising the side plates 250 and the tubular member 253 and the track 256 in a counterclockwise direction (Fig. 20a) to the position of Fig. 5, as will be explained more clearly hereinafter. This movement is effected by grasping the handle of the paper clamp, which is designed to enable the aforesaid frame to be swung in the manner specified, and swinging the frame by hand. A bar 20b (Figs. 1, 2, and 5) secured to the front cover 20c limits clockwise movement of the paper table frame and supports the latter (Fig. 5) by engaging the edges of plates 251. The initial movement of the paper table frame is utilized to release the latches 95 to permit the platen to rise under the influence of the springs 88 and 99. This movement of the platen is also controlled by the movement of the paper table frame. For this purpose the plates 251 are formed along their lower edges as cams 251a (Figs. 5 and 20a). These cams engage rollers 259 which are mounted on studs carried by the arms 83.

Mounted on the right-hand side of the right-hand plate 251 (Fig. 3) is a stud 261 which has a reduced portion extending to the right into the plane of a hook-shaped cam arm 95d forming part of the right-hand latch 95. This stud is also shown on a small scale in Fig. 2. When the paper table frame is rotated in a counterclockwise direction (Fig. 2) the stud 261, engaging the inner cam edge of the arm 95d, rotates the right-hand latch 95 and the shaft 96 to release both latches 95 from the lugs 97a. This operation takes place at the very beginning of the movement of the paper table frame whereby the platen will be unlatched automatically in consequence of movement of the paper table frame.

The subsequent movement of the frame including plates 251 is utilized to control lifting movement of the platen by means of the cams 251a and rollers 259 and also to effect a retracting movement of the carbon stripper truck 30 to shift the carbon sheets from a set of completed forms to the succeeding set of blank forms. The operating connections by means of which the retracting movement of the truck 30 is effected are shown diagrammatically in Fig. 12 and parts of these connections are shown in Figs. 1 to 6, 11, 14, 15, and 20a. The connections consist mainly of a system of pulleys which, for the most part, is located in the space between the members 29a and 29b of the track 29.

Secured to the left-hand side of the left-hand plate 251 by means of a fixed stud 262 is a spring motor casing 263 which is most clearly shown in Figs. 3, 4, 5, 14, and 15. Rotatably mounted on the stud 262 within casing 263 (Figs. 14 and 15) is a pulley 264 on which is wound a cord 265. Anchored to the hub 264a of the pulley 264 and to a bracket 263a secured to the inside of the case 263 is a spring 266. This spring always tends to wind the cord 265 on the pulley 264 so as to maintain the cord under tension at all times.

The cord 265 passes from pulley 264 over a pulley 267 mounted on plate 251, over a pulley 268 (Figs. 3 to 6, and 20a) which is pivoted on a stud 110d mounted on an extension 110e of the left-hand guide plate 110. The cord then passes downwardly around a pulley 269 (Figs. 1, 3, 12, and 20a) mounted on an extension 133a (Fig. 3) of one of the brackets 133. The cord then passes horizontally toward the track 29 and around a pulley 271 (Figs. 3, 6, and 12) journaled on a stud fastened to the underside of the cover plate 29b (Fig. 6). From the pulley 271, cord 265 extends rearwardly of the carriage and parallel with edges of the track and is secured to the front end of a coil spring 272.

Figure 11:
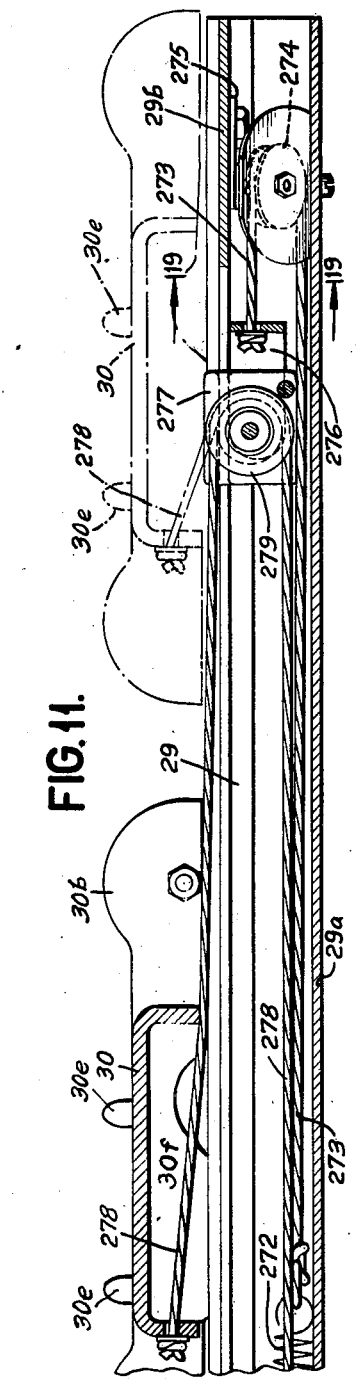
Fig. 11 is a vertical section on the line 11—11 in Fig. 1.

The rear end of the coil spring 272 (Figs. 6, 11, and 12) is secured to one end of a cord 273 which passes around a pulley 274 (Figs. 11, 12, and 19) mounted on a bracket 375 secured to the members 29a, 29b, as best shown in Fig. 19, in such fashion that pulley 274 makes an acute angle with respect to the top surface of member 29a. After it passes around the pulley 274, the cord 273 is secured to the stirrup 276 of a sheave including blocks 277 similar to the blocks 57 and slidably mounted in the same way on cover plate 29b as shown in Fig. 11. However the portion of the slot 29f in cover plate 29b in which blocks 277 are slidably mounted is much longer than the slot 29d as best shown in Fig. 1.

A cord 278 is fastened to the front part of the truck 30 by passing the end of the cord through a hole in the truck 30 and forming a knot thereon. This cord, as shown in Figs. 11 and 12, passes around the pulley 279 carried by blocks 277 and then runs forwardly to the front end of the track 29 and around a fixed snubber block 280 secured to the underside of cover plate 29b, as shown in Figs. 6 and 12. This block 280 is semicircular and grooved to receive cord 278.

The cord 278 next passes through an opening 29g (Figs. 1 and 3) in the cover plate 29b in front (to the left, Fig. 9) of bracket 53. The cord is protected by two half-grommets 281, one cemented to the left-hand half of the opening 29g, and the other to the bracket 53. The end of the cord is then secured to the stop 62 by being passed between said stop and then the belt 48 so as to be clamped between the belt and stop, as shown in Fig. 7. In order to insure that the cord 278 will not be pulled from between the stop 62 and belt 48 the cord is knotted at 278a (Fig. 9).

For the purpose of guiding the forms onto track 29 and truck 30 from a stack located behind the machine and beneath the rear end of the track 29, there is provided form guiding means which is shown in Figs. 1, 2, 6, 8, and 8a. Secured to the underside of the rear end of the channel-shaped member 29a, is a curved guide plate 282 which is semi-circular in vertical section and is provided with a plurality of circumferential beads 282a which stiffen the plate against bending. The upper edge of the plate 282 near the ends thereof is provided with two slots 282b for guiding the two side guides 283, as shown in Fig. 1. The side guides 283 (Figs. 6, 8, and 8a) consist of arms which are U-shaped at their lower ends and the longer arms are slotted at 283a to accommodate the edges of the plate 282 adjacent slots 282b. The shorter arms of side guides 283 are formed as tabs 283b projecting through and loosely fitting the slots 282b. Thus the side guides 283 may slide along the edge of plate 282 but are prevented from turning on a vertical axis in consequence of the tabs 283b. The side guides 283 are locked in their adjusted positions along slots 283a by means of thumb nuts 284 screwed on the shanks of studs 284a screwed into holes in the arms 283. The side guides 283 extend upwardly and are provided with holes to receive a rod 285. The latter overlies the forms (not shown) and prevents them from being lifted from between the side guides 283. In order to hold the rod in place and at the same time to allow adjustment of the side guides 283, collars 283c secured to arms 283 and thumb screws 286 are provided.

At the front end of the track 29 there is provided a second set of side guides, which are resiliently mounted for a purpose hereinafter to be explained. Secured to the top surface of the cover plate 29b are two fingers 287 (Figs. 1, 3, and 6) which are formed by bending flat strips of sheet metal into a curve and given a spring temper so as to make them resilient. Secured to the free ends of the fingers 287 is a tube 288 (Figs. 3, 6, and 8b). Slidably mounted on the tube 288 are side guides 289 comprising flat arms having hubs 285a loosely receiving the shanks of thumb screws 290, which are threaded in short rods 291 slidable in the tube 288. The ends of the tube 288 are slotted longitudinally to receive the shanks of the thumb screws 290, which prevent the side guides 289 from rotating on the tube 288. When the thumb screws 290 are tightened, the hubs of the side guides 289 and the tube 288 are clamped together between the heads of the thumb screws 290 and the short rods 291. The arms 287 are flexible enough to permit the tube 288 to be moved downwardly when tension is suddenly applied to a pack of forms with interleaved carbon sheets passing over the tube 288 and between the side guides 289. The side guides 289 are provided with a rod 285, collars 283c, and thumb screws 286 as in the case of the side guides 283.

The front, or left-hand end (Fig. 6) of the track 29 is resiliently connected to the carriage by means shown in Figs. 3, 6, 17 and 18. As best shown in Fig. 3 the top plate 29b is provided with a slot 29f in which a rectangular block 292 loosely fitting the slot 29f. The block 292 is loosely mounted on a stud 293 carried by a block 294 (Figs. 17 and 18) guided on the marginal stop rack 295 by means of a U-shaped member 296 which is riveted to the block 294. The assembly comprising block 292, stud 293, block 294, and member 296 are loosely slidably mounted on the marginal stop rack 295 which for the purpose is devoid of teeth near its center for a portion of its rear edge as shown in Fig. 17. The block 292 is held on the stud 293 by means of a nut 293a.

Secured to the rear face of the member 296 (Fig. 17) is a spring anchoring stud 296a to which are anchored springs 297 which are also anchored to studs 295a located on rack 295 on opposite sides of the stud 296a, whereby the member 296 is held in a central position on the marginal stop rack. This construction provides a resilient connection between the forms carrier and the carriage to minimize the effect of shocks resulting from the movements of the carriage, as when the carriage is suddenly arrested by the marginal stops or column stops. Since the block 292 fits the slot 29f loosely, the track 29 may be easily disconnected from the carriage by merely lifting the forms carrier from the rails.

In order to move the forms carrier with the carriage it is necessary that the tension of the main power spring for the carriage be augmented to take care of the additional load on the carriage due to the size of the forms carrier. This additional spring tension is obtained by means of a power spring which supplements the main power spring for the typewriter carriage (not shown) when the forms carrier is in use.

Secured to the rear face of the gear 35 (Figs. 6 and 10) is a spring housing 300 to which is anchored one end of a power spring 301, the other end of which is anchored to the hub of gear 302 loose on shaft 36. The gear 302 is provided with a disc 302a of the same diameter as the housing 300. The toothed portion of the gear 302 is located in a recess formed in the frame 26, which at this point is formed as a housing adjacent the front end of shaft 36 to receive the gear 302. This housing is also formed to provide a space for a worm 303 which is rotatably supported by the housing and meshes with the gear 302, and is provided with a slot at one end whereby the worm may be turned with a screw driver to regulate the tension of the spring 301. The power of the spring applied to shaft 36 tends to rotate the gears 35 in a counterclockwise direction (Fig. 10) to feed the forms carrier with the typewriter carriage whenever the latter moves in the letter spacing direction.

A form of paper clamp suitable for use with long forms is shown in Figs. 1, 2, 20a, 21 and 23. This clamp is slidably mounted on the track 256 and may be moved extents dependent on the lengths of the forms and the desired amount of retraction of the carbon sheets. By means of this clamp a shifting movement can be effected between the forms and the carbon sheets to supplement the movement resulting from retraction of the carbon sheets by means of the carbon stripper truck 30. The extent of this supplemental movement is regulated by an adjustable stop mounted on the track 256.

The main part of the clamp may be termed the carrier and comprises a light metal stamping preferably made of aluminum or one of the other light alloys. This member is roughly L-shaped in outline (Fig. 21) and in section is substantially flat except around the edges and is provided with four rollers 304a which ride in grooves 256a (Fig. 22) in the member 256. For this purpose said member is shaped somewhat like a vertically elongated "C" in section with the open portion facing the front of the machine. One portion of carrier 304 is formed as a handle 304b extending diagonally upwardly and to the right from the main portion as viewed in Fig. 21. In order to impart strength to the carrier 304, edges are flanged or rolled varying heights and at the lower end of the main portion the flanges are highest and brought substantially parallel as indicated at 304c (Fig. 21). Portions of the flanges 304c are cut away to provide a throat 304d to receive the leading edges of the forms and, in order to guide the forms into the throat, the edges of the flanges 304c which form the throat are smoothly curved and the flat portion of the carrier 304 is slightly bent as shown at 304e to form a tongue which pivots into the channel formed by member 256 as best shown in Fig. 20a.

The flanged portions 304c pivotally support the clamp member 305 by means of a pin 306. The clamp member 305 is curved upwardly and to the right (Fig. 21) to form a finger piece 305a which may be pressed rearwardly by the operator's thumb when the handle 304b is gripped naturally with operator's right hand. The clamp member 305, as most clearly shown in Fig. 20a, is bent around the pivot pin 306 and is further bent at right angles to the body of said member to form a jaw 305b which confronts the front surface of the member just below the end of the throat 304d and between flanges 304c. The jaw 305b extends at substantially right angles to the body of the clamp member 305 when the clamp is closed and is located very close to the pivot pin 306 so as to securely grip the edges of the forms in the throat 304d with a very slight pressure of the thumb on the finger 305a.

In forming the clamp member 305, one end of a curved leaf spring 308 (Figs. 20a and 21) is pinched between the jaw 305b and the part of the member 305 on the same side the pivot pin 306 as jaw 305b. The upper end of the leaf spring 308 bears against a plunger 309 (Figs. 20a, 21, and 23) which is slidably mounted in a bushing 310 (Fig. 23) projecting through a hole in carrier 304 located directly behind the mid-point of the member 305 and in a bushing 311 which is screwed over the bushing 310 on the side of the carrier 304 facing member 305. The plunger 309 has a shoulder 309a located at approximately the middle of the plunger and interposed between this shoulder and the head of the bushing 310, internally of the bushing, is a compression spring 312 which tends to press the plunger 309 toward the member 305. Normally springs 308, 312 cooperate to hold the finger piece 305 in the position of Fig. 20a against a stop pin 306a carried by flanges 304c.

The plunger 309 is designed to act as a latch in cooperation with an adjustable stop mounted on track 256. This stop is most clearly shown in Figs. 20b, 21 and 22 and comprises a body member 313 having its ends bent partly around the edges of the track 256. The member 313 has a hole at its middle through which passes the shank of a thumb screw 314 which is screwed into a hole in a T-shaped member 315 having ends of the cross bar of the T bearing against the front inside surface of the grooved portions of track 256. The cross bar is slightly bowed as shown in Fig. 22. Thus, by turning the thumb screw 314, the member 313 may be clamped in any desired position along the track 256.

The member 313 is formed with a bent-over lug 313a designed to engage the rolled edge of carrier 304 so as to limit movement of the paper clamp along track 256 in a direction away from the platen. The vertical bar of the T-shaped member 315 extends in the direction of the platen and parallel with the track 256 and is bent at 315a to form a latch lug designed to take a position just below the end of the plunger 309 when the paper clamp is stopped by the stop lug 313a.

The operation of the machine will now be described. It will be understood that a pack of continuous forms comprising a plurality of separate webs has been loaded on the forms carrier in a well-known way and interleaved with carbon sheets attached to the bars 41 by suitable means such as clips. The forms will be arranged to pass over the curved surface of the plate 282 (Fig. 2) at the right-hand end of the track 29 and underneath the rear rod 285 and at the front end of the track will pass over the tube 288 and underneath the front rod 285 supported by this tube. The rear side guides 283 and the front side guides 289 will be adjusted close to the edges of the forms so as to guide the forms parallel with the longitudinal axis of the track 29. Before loading the forms, the platen is raised by gripping the handle 304b and pulling it toward the operator, thereby swinging the paper table frame forwardly or in a counterclockwise direction from the position of Figs. 2 and 20a to the position shown in Fig. 5. This operation causes the stripper carriage 30 to be drawn rearwardly along track 29 until the truck strikes the stop 62. This operation will be explained more clearly hereinafter. The forms are placed on the forms carrier with the platen in this position and the platen is lowered by gripping the handle 304b and moving it rearwardly. After the platen has been lowered, the forms are tucked under the knife 255 which is swung away from the paper table for this purpose and kept in that position until forms are to be severed.

The operator may now position the first set of forms for the first line of writing by turning the knobs 82a and typewrites the first set of forms. As the forms are typed line-by-line the leading edges feed upwardly over the paper table 250 and underneath the knife into the throat 304c of the clamp. Normally the paper clamp occupies a position with the bent-over portion 304e abutting the edge of the opening 250d in the paper table designed to admit the track 256. As the typing of the first set of forms proceeds, the leading edges thereof will enter the throat 304c and the forms will progressively lift the clamp. This is possible because of the fact that the clamp is purposely made of very light material and offers very little resistance to the pressure of the forms.

After the first set of forms has been typed, the operator grasps the handle 304b and draws it forwardly, thereby swinging the paper table 250 and its frame in a counter-clockwise direction (Figs. 2 and 20a) or in a clockwise direction (Fig. 4) to the position of Fig. 5.

After the paper table frame has reached the position of Fig. 5, the operator continues to pull the handle 304b forwardly causing the paper clamp to slide along the track 256 until it is stopped by the lug 313a. In moving the paper table in this position, the finger piece 305a is pressed by the operator, thereby causing jaw 305b to press the leading edges of the forms firmly against the clamp carrier 304 to grip the forms securely by the leading edges. Thus the forms will be drawn forwardly independently of the carbon sheets as consequence of the movement of the clamp into engagement with stop 313a. The stop 62 is initially adjusted to limit retracting movement of the carbon stripper carriage to such an extent that the carbon sheets are always shifted far enough for their leading edges to attain a position from ¼ to ½ inch short of the transverse lines of separation between the sets of forms whereby, when the clamp finger piece 305a is operated, the leading edges of the forms will be gripped but not the carbon sheets.

During the initial swinging movement of the paper table frame, the cord 265 (Fig. 4) is fully unwound from the pulley 264. The spring 266 is considerably weaker to the spring 272 (Fig. 12) whereby at first only a slight tension is applied to the cord 265. This allows the platen to become unlatched in consequence of the cooperation of the stud 261 with the arm 95d.

After the platen becomes unlatched, the further swinging movement of the paper table frame applies tension to the cord 265, since said cord in consequence of the fact that it is secured to the pulley 264 can no longer unwind. Thus, as the paper table continues its swinging movement, tension is applied to the spring 272 thereby elongating the spring and storing power therein which will be subsequently utilized to retract the carbon stripper truck 30. The continued movement of the paper table frame also allows the platen to rise under the influence of the springs 88 and 99, with the springs 88 contributing an increasingly greater force towards the force needed for lifting the platen in consequence of the fact that the leverage exerted by arms 88 becomes more favorable as the platen rises. The platen is allowed to rise smoothly and without shock in consequence of the cooperation of the rollers 259 with the cam surfaces 251a formed in the side plates 251 of the paper table frame.

Initially, the forms being curved sharply around the platen, hold the carbon sheets against retraction by a snubbing action thereby holding the truck 30 against retraction and allowing spring 272 to become elongated. Eventually, however, as the forms approach a straightened condition, the snubbing action on the carbon sheets will become less and there will be a point reached in the lifting movement of the platen where the friction on the carbon sheets will not be enough to hold them and the spring 272 will commence to retract the carbon stripper truck 30. The tension induced in spring 272 by the cord 265 during the lifting movement of the platen will, of course, be transmitted to the cord 273 whereby the sheave comprising the stirrup 276, the blocks 277, and pulley 279 will be drawn to the rear end of the track 29. Since one end of the cord 278 is attached to the stop 62 and thereby is held against movement, the rearward movement of the pulley 279 will cause tension to be applied in the end of the cord 278 which is attached to the truck 30 causing the latter to move toward the rear end of the track 29.

Initially, the truck 30 will move very slowly but will gain in speed as the snubbing action of the carbon sheets becomes less until, when the paper table frame reaches the position of Fig. 5, the carbon sheets will be fully retracted. As the platen rises, the snubbing action on the forms also becomes less whereby, if the operator applies tension to the leading edges of the forms by exerting a force tending to draw the clamp towards the stop 313a, the forms will also be drawn toward the operator, or to the left in Fig. 2. If the operator so desires, the paper table may be first swung to the position of Fig. 5 without any attempt to be made to draw the clamp along the truck 256 and the clamp may be drawn toward the operator after the platen has reached the raised position and the carbon stripper truck 30 has finished its retracting movement. Thus there are two possible ways in which the operation of stripping the forms may be effected with no substantial difference as far as the ultimate result is concerned. In order to effect the simultaneous retraction of the carbon sheets and movement of the forms toward the operator it will be necessary, for a time at least, that the operator exert a lifting force on the handle 304b and, as this may not be very comfortable to some operators, the movement of the clamp along the track may be deferred until the platen has become fully displaced and the carbon stripper truck 30 has completed its retracting movement.

The principal advantage of the machine is that the operation thereof is made simpler and considerably more convenient, since the separate operations of lifting the platen and retracting the carbon sheets may be effected with a relatively simple movement of one hand instead of requiring the use of both hands as in the past.

When the paper clamp reaches the end of its stroke and abuts the stop 313a, the plunger 309 will snap over the lug 315a thereby latching the paper clamp to the adjustable stop 313. This assumes that the operator maintains a firm grasp on the finger piece 305a to hold the plunger 309 depressed against the tension of spring 312. The operator retains a grip on both handle 304b and finger piece 305a and restores the paper table frame to its initial position by pushing rearwardly and upwardly on the handle. This causes the paper table frame to rock in a counterclockwise direction (Fig. 5) back to the position of Fig. 4.

During the return stroke of the paper table frame, the cam surfaces 251a ultimately engage the rollers 259 and press the arms 83 in a clockwise direction (Fig. 5) against the tension of springs 88 and 99 thereby restoring the platen to its typing position. The latches 95 are automatically released as soon as the platen reaches the latching position whereby the arm 95d will be permitted to move over the stud 261 in readiness for the next displacement of the platen.

The paper clamp remains in latched relationship with stop 313 until the operator releases the finger piece 305a whereby the finished set of forms is held at the leading edges thereof so as to maintain a tension on the forms while the platen is being restored. Thus the forms cannot become displaced or drawn backwardly by movement of the platen to the typing position. Consequently, it is possible by suitable adjustment of the stop 313 to maintain the forms with the line of severing perforations between the completed set and the next succeeding set in register with beveled edge 255b of the knife 255. Upon release of the clamp by the operator, the forms may be severed by pressing on the middle of the knife with a finger of one hand so as to push the knife against the forms and utilizing its edge to tear them apart with the other hand. After the forms have been severed, the knife may be moved away from the paper table and the platen knobs 82a may be turned to move the succeeding set of forms sufficiently to bring the space thereon for the first line of writing to typing position.

In order to reduce the load upon the platen all unnecessary weight has been eliminated and for this reason certain interlocks which might be desirable to use to insure a definite cycle of operations have been avoided. For instance, there is no means provided to compel the paper table frame to restore to the position of Fig. 4 when a force is applied directly to the platen knobs 82a to force the platen back to its writing position. It is thus possible for the operator to restore the platen independently of the paper table and this may even happen accidentally. This restoration of the platen independently of the paper table can have but one harmful effect. When the platen is fully restored, the arm 95b will automatically resume the position shown in Figs. 2 and 3 and, if no means were provided to prevent such action, the stud 261 being in the plane of the arm 95d might strike the top edge of such arm and prevent full restoration of the paper table. In order to prevent this action from taking place, the stud 261 is mounted in exactly the same fashion as the pin 309 (Fig. 23) and the edge of arm 95d is bent slightly to one side as shown in Fig. 3 to provide a cam surface which, by engagement with the end of the stud 261, cams said stud to the left (Fig. 3) to permit it to pass the arm 95d and snap under said arm as in Fig. 2. By this simple means, it is possible to avoid a number of parts necessary to link the paper table frame to the platen supporting frame in a manner to compel the paper table frame to restore with the platen.

There are certain applications of billing machines to shipping departments of manufacturing corporations where it is necessary to type very small bills or other forms which must be used immediately after the forms are typed requiring that each completed set of forms be severed from the next succeeding blank set before the succeeding set is typed. The paper clamp illustrated in Figs. 20a and 21 is not suitable for such applications because it cannot move near enough to the platen to grip the leading edges of the short forms after the type has been finished. For this reason, a form of clamp has been devised which is specially suitable for the typing of short forms and is designed so as to approach very close to the platen. When short forms are typed, usually only a very few lines are written on the form such as a name and address. Particularly is this the case where the forms are so arranged that the ribbon copy consists of an addressing label which is to be immediately pasted upon a shipping package.

In Fig. 24 there is shown a modified clamp which is suitable for small forms. Basically this clamp is quite similar to the clamp shown in Fig. 21 insofar as the shape of the members 304 and 305 and the manner of mounting the same are concerned and the identical parts are similarly designated in Fig. 24. The carrier is designated 304s in Fig. 24 and differs from the carrier 304 shown in Fig. 21 in that the portion 304e is not bent but is beveled and straight whereby the carrier 304s may be adjusted downwardly until the portion 304e is very close to the top of the platen.

The carrier 304s for the short form clamp is mounted on a flat plate 320, which is somewhat longer than the width of the space between the turned edges of the track 256, and has its longer edges provided with shoulders whereby the plate 320 is free to slide along the track 256 but is prevented from turning in its own plane. The carrier 304s is not rigidly secured to the plate 320 but is attached to said plate at the upper end thereof by means of two studs like 320a which are shouldered to loosely fit holes in the carrier 304s whereby the carrier 304s is permitted a small amount of pivotal movement on an axis parallel with the upper edge of the plate 320. The leaf spring 308 in this case bears against a shouldered stud 321 which is riveted to the plate 320 and the shoulder on the stud 321 loosely fits a hole in the carrier 304s so as to permit the slight pivotal movement noted above. The head of the stud 321 is spaced from the plate 320 by the shoulder and stud a distance considerably greater than the thickness of the carrier 304s and a spring 322 shaped like a conventional lock washer is interposed between the head of the rivet and the carrier 304s. This spring 322 tends to resist the aforementioned pivotal movement of the carrier 304s on studs 320a.

The track 256 is straight in this case, instead of being slightly curved, so that the edges of the track will be parallel to the surface of the paper table 250 whereby to permit the lower end of the clamp carrier 304s containing the jaws of the clamp to overhang the paper table so as to approach very closely to the platen and enable the clamp to grip a very short form at the delivery side of the platen. The carrier 304s is not movable to draw the forms toward the operator but, once adjusted in position, remains fixed throughout the operation of the machine. For this purpose, there is provided a clamp plate 323 which is slightly bowed, as in the case of the member 315, to engage the inside faces of the turned edges of the track 256. A thumb screw 324 passes loosely through a hole in the plate 320 and is threaded into a hole in the plate 323. The carrier 304s is provided with a large hole surrounding the finger piece of thumb screw 324 to permit pivotal movement of the carrier on said plate.

In writing a bill which is very short the clamp shown in Fig. 24 is adjusted to such a position that the line spacing movement incidental to the typing of the last line on the set of short forms will feed the leading edges of the forms into the throat 304d. The operator then displaces the platen and thereby effects the shifting of the carbon sheets in the same manner described above in conjunction with the form of clamp shown in Fig. 20a.

Since the lower part of the carrier 304s must be adjusted over the surface of the paper table 250, it is absolutely necessary that the forms be guided over the beveled surface 304e into the throat 304b otherwise one or more of the forms might tend to slip between the paper table 250 and the beveled portion 304e with consequent inconvenience to the operator and with the liability that the forms might become torn when they are grasped by the operator before severing them with the knife. It is for this purpose that the carrier 304s is pivotally mounted on the studs 320a and provided with the spring 322. This spring operates to press the beveled portion 304e firmly against the paper table 250 and, by acting as a stripper, prevent any of the forms or carbon sheets slipping between beveled portion 304e on the paper table.

The plate 320 is made of such length that carrier 304s may be adjusted downwardly so that the beveled portion 304e occupies a position with the beveled surface practically tangent to the top of the platen in order to make it possible to use forms which may be only an inch high in which case the line of perforations which separate one set of forms from the next may have a position at, or just a little below, the writing line.

While there has been shown and described and pointed out the fundamental novel features of the invention as applied to a single embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a continuous billing machine, the combination of a carriage, a platen, means to movably mount the platen on the carriage for displacement from a typing to a non-typing position, a forms carrier including a retractable carbon sheet anchoring device, means for displacing the platen, forms supporting and guiding means movable to render the displacing means effective, and means connecting the forms supporting and guiding means to said carbon sheet anchoring device to actuate said device when the platen is displaced.

2. In a continuous billing machine, the combination of a carriage, a platen mounted on the carriage, means to displace the platen from a typing position to a non-typing position including a manually operable member and means releasable by a movement of said member for holding the platen in the typing position; a forms carrier coupled to the carriage for movement therewith, said forms carrier including a movable carbon sheet anchoring device; and means directly interconnecting said member and said device for actuating the latter to shift the carbon sheets from one set of forms to the succeeding set of forms upon each displacement of the platen by the manually operable member.

3. In a continuous billing machine, the combination of a carriage; a forms carrier connected to the carriage for movement therewith, said forms carrier including a track extending rearwardly of the carriage and a carbon sheet anchoring device mounted on said track for reciprocatory movement toward and away from the carriage in a direction at right angles to the line of travel of the carriage; a stop for limiting the movement of said device in one direction, a movable support for said stop extending the length of said track, and means located close to the carriage at the front end of the track for moving said support to adjust said stop.

4. In a continuous billing machine, the combination of a carriage, a platen, means to movably mount the platen on the carriage for displacement from a typing position to a non-typing position, means to move the platen to the non-typing position, releasable means to hold the platen in the typing position, movable means operable to release the holding means and permit the moving means to displace the platen, said movable means being operative to positively restore the platen to its typing position, a forms carrier located behind the carriage for supporting and guiding forms to the platen, said forms carrier including a movable carbon sheet anchoring device, and means whereby the carbon sheet anchoring device is moved by the releasing means when the platen is displaced.

5. In a continuous billing machine, the combination of a carriage, a platen, means to movably mount the platen on the carriage for displacement from a typing to a non-typing position, a paper table located at the delivery side of the platen for supporting a pack of continuous forms led around the platen at the delivery side thereof; a forms carrier located behind the carriage at the introductory side of the platen and supporting and guiding said pack of forms to said platen, including a movable carbon sheet anchoring device; means to movably mount the paper table for a swinging movement to enable forms wrapped around the platen to be drawn into a straight stretch underneath the platen, means whereby said mounting means when operated causes the platen to become displaced to the non-typing position, means coupling said carbon sheet anchoring device to the supporting means of the paper table whereby the movement of said supporting means also operates the carbon sheet anchoring device to effect a displacement between the carbon sheets anchored to said device and said forms, and means on the supporting means for the paper table for effecting a supplemental shifting movement between the carbon sheets and said forms.

6. In a continuous billing machine, the combination of a carriage, a forms carrier including a movable carbon sheet anchoring device, a platen, means to mount the platen on said carriage for movement from a typing position to a non-typing position to enable forms interleaved with carbon sheets wrapped around the platen to be stretched out flat, a movable paper table for supporting the forms at the delivery side of the platen, platen displacing means rendered effective by movement of the paper table, an operative connection between the paper table and the carbon sheet anchoring device for effecting movement of the carbon sheet anchoring device by movement of the paper table, and a forms gripping device mounted on the paper table for gripping the leading edges of the forms and including an operating handle for moving the paper table and the carbon sheet anchoring device together.

7. In a continuous billing machine, the combination of a platen, a movable carbon sheet anchoring device, a paper table, means to mount the paper table for movement away from the platen, and means coupled to the mounting means for the paper table for actuating the carbon sheet anchoring device by the movement of the paper table.

8. In a continuous billing machine, the combination of a carriage, a second carriage, means to mount the second carriage for movement toward and away from the platen at right angles to the line of travel of the first carriage, means to displace the platen from a typing to a non-typing position, means for controlling the displacement of the platen, and means directly connected to the controlling means for actuating the second carriage by movement of the displacement controlling means.

9. In a continuous billing machine, the combination of a carriage, a platen displaceably mounted in the carriage, a paper table, a movable support frame for the paper table to enable the paper table to be moved away from the platen when the latter is displaced; a forms carrier mounted behind the carriage for guiding a pack of forms with interleaved carbon to said platen and including a carbon sheet shifting device, said forms extending around the platen and over the paper table; a paper clamp for gripping the leading edges of the forms and applying tension to said forms, means to movably mount the paper clamp on the paper table support frame and means actuated by the paper table support in its movement for actuating the shifting device.

10. In a continuous billing machine, the combination of a carriage, a platen, means to displaceably mount the platen for movement from a typing to a non-typing position, a forms carrier located behind the platen for guiding forms to the introductory side of the platen, a movable frame located at the delivery side of the platen, a paper table on said frame for receiving the leading portions of said forms as they are typed, a track on said frame, a freely movable clamp mounted on said track, a stop on said track for limiting movement of the clamp away from the platen, said clamp having an operating handle by means of which said frame and said clamp may be moved, and means controlled by movement of said frame for displacing the platen.

11. In a continuous billing machine, the combination of a carriage, a platen, means to mount the platen on the carriage for displacement to a position to enable a pack of forms interleaved with carbon sheets wrapped around the platen to be drawn straight, operating means for controlling the displacement of the platen; a forms carrier for guiding the forms and interleaved carbon sheets to the platen, said forms carrier including a movable device having means to anchor the ends of carbon sheets and movable, when the forms have been straightened, to shift the carbon sheets from one set of forms to a succeeding set of forms; and means actuated by said operating means for moving said device whenever the platen is displaced.

12. In a continuous billing machine, the combination of a carriage, a platen mounted on the carriage; a forms carrier for supporting and guiding a pack of forms with interleaved carbon sheets to the platen, said forms carrier including a device having means to anchor the carbon sheets thereto, said device being operable to effect a displacement between forms and the carbon sheets, the leading portions of said forms and portions of the interleaved carbon sheets being partially wrapped around the platen; means to movably mount the platen in the carriage for displacement to a position to enable the carbon sheets to be shifted relative to the forms by said device, a clamp having jaws located in a position to receive the leading edges of the forms while they are being typed, a clamp support, means for movably mounting said clamp to enable the forms to be drawn forwardly and relative to the carbon sheets while the carbon sheets are being shifted, and means to effect a displacement of the platen and actuate said device by an operation of said clamp support.

13. In a continuous billing machine, the combination of a typewriter having a frame, a carriage and a platen movably mounted on the carriage for displacement from a typing to a non-typing position, a forms carrier including a one-piece track extending at right angles to the line of travel to said carriage and a carbon shifting device mounted on said track for movement at right angles to the line of travel of the carriage along said track, a pair of trucks secured to said track, rails for supporting and guiding said trucks for movement parallel to the line of travel of the carriage, a common base for said forms carrier and the main frame of said typewriter, and separate frame members on said base for supporting said rails; means to detachably attach the said truck to said carriage, said means being disconnectable by lifting said forms carrier from said rails; and means cooperating with both trucks to compel said trucks to travel equal extents in the direction of travel of the carriage.

14. In a continuous billing machine, in combination with the platen, pressure rollers cooperating with the platen to feed a pack of continuous forms interleaved with carbon sheets, a forms carrier located at the introductory side of the platen and including a carbon shifting device movable toward and away from the platen longitudinally of the forms for supporting said forms and for retracting the carbon sheets; means for effecting a separation between the platen and the pressure rollers to enable the carbon sheets to be shifted relative to said forms by said shifting device, a movable support located at the delivery side of the platen, a device mounted on said support for gripping the leading edges of the forms and operable by movement of the support to shift the forms relative to the carbon sheets to supplement the shifting movement effected by said shifting device, and means whereby the movement of the support actuates the shifting device.

15. In a continuous billing machine, in combination with a platen, pressure rollers cooperating with the platen to grip a pack of continuous forms interleaved with carbon sheets partially wrapped around the platen, a forms carrier located at the introductory side of the platen and including a carbon sheet shifting device movable toward and away from the platen for effecting a displacement of the carbon sheets relative to the forms, means to mount the platen for movement away from the pressure rollers an extent sufficient to permit said device to shift the carbon sheets, an adjustable stop for limiting the shifting movement effected by said device; a movable support located at the delivery side of the platen, said support when moved being operative to cause a separation between the platen and the pressure rollers; a forms gripping device movably mounted on said support, said gripping device having an operating handle, and means actuable by said handle to cause said device to grip the leading edges of forms, said device being movable in a direction away from the platen to effect a further shifting movement between the carbon sheets and the forms to supplement the shifting movement determined by said stop, said handle serving as a means of moving said support; and means interconnecting said support and said shifting device to enable both the gripping device and shifting device to be actuated by said handle in a single cycle of operation.

16. In a continuous billing machine, the combination of a platen, pressure rollers cooperating with the platen to grip a pack of continuous forms with interleaved carbon sheets, means to effect a separation between the platen and the pressure rollers to enable the carbon sheets to be shifted relative to the forms, means normally effective to hold said platen in cooperation with the pressure rollers to enable the platen to feed said pack of forms, a carbon shifting device located at the introductory side of the platen for effecting a shifting movement between the carbon sheets and the forms, a movable support located at the delivery side of the platen, means mounted on said support for gripping the leading edges of the forms and freely movable along said support to effect a further shifting movement between the carbon sheets and the forms, means whereby movement of the support disengages the holding means to enable the platen and pressure rollers to separate, and a handle for operating the gripping device and moving said support.

17. In a continuous billing machine, the combination with a platen and pressure rollers cooperating with the platen to feed a pack of forms with interleaved carbon sheets, a carbon sheet anchoring device located at the introductory side of the platen, means to effect a separation between the pressure rollers and the platen to enable a relative shifting movement between the forms and the carbon sheets, a movable support located at the delivery side of the platen including a track extending at right angles to the platen, form gripping means mounted on said track for movement away from the platen at right angles thereto, means responsive to movement of said support for effecting a separation between the platen and the pressure rollers when said support is moved, and means for drawing the gripping means along said track and moving said support.

18. In a continuous billing machine, the combination with a platen, pressure rollers cooperating with the platen to feed a pack of work sheets with interleaved carbon sheets partially wrapped around the platen, a carbon sheet anchoring device located at the introductory side of the platen, a frame pivotally mounted at the delivery side of the platen; a sheet gripping device having jaws engageable with the leading edges of the work sheets and movably mounted on said frame, said form gripping device being movable on said frame away from the platen to effect a displacement between said work sheets and said carbon sheets; means to actuate said jaws to grip the edges of the work sheets and to swing said frame to draw the work sheets into a straightened condition prior to effecting a displacement between said sheets and the carbon sheets, and means responsive to said pivotal movement for effecting a separation between the platen and the pressure rollers to enable work sheets to be shifted relative to the carbon sheets.

19. In a continuous billing machine, the combination with a carriage, a forms carrier attached to the carriage and including a retractable carbon carrier, a platen, means to mount the platen on the carriage for displacement from a typing position to a non-typing position to enable a pack of forms interleaved with carbon sheets supported by the forms carrier and wrapped around the platen to be straightened as a preliminary to retraction of the carbon sheets by the carbon carrier, means to displace the platen, locking means for holding the platen in the typing position, a paper table support movably mounted in the carriage, means responsive to movement of the paper table support for releasing the holding means to enable the platen displacing means to displace the platen to the non-typing position, means whereby the movement of the paper table restores the platen to the typing position; and means comprising a system of pulleys and cords, including a cord attached to the paper table support, for retracting the carbon carrier when the paper table support is moved.

20. In a continuous billing machine, the combination of a carriage, a platen, a swing frame mounted in the carriage and pivoted at the rear thereof for movably supporting the platen at the front of the carriage, means normally actuating the swing frame in a direction to displace the platen from a typing position to a non-typing position, means for holding the swing frame with the platen in the typing position, a paper table, a pivoted supporting frame for the paper table enabling the paper table to be swung forwardly of the platen, means actuated by the paper table frame in its forward swinging movement for releasing the holding means; means including a cam and a roller, one of which is mounted on the swing frame and the other attached to the paper table frame, for restoring the swing frame when the paper table frame is restored; a forms carrier extending rearwardly of the carriage and supporting a pack of forms with interleaved carbon sheets which pass around the platen and including a carbon sheet retracting device, and means to enable the carbon sheet retracting device to be actuated by movement of the paper table frame.

21. In a continuous billing machine, the combination of a carriage, a platen displaceably mounted on the carriage for moving from a typing to a non-typing position to enable forms with interleaved carbon sheets wrapped around the platen to be straightened for retraction of the carbon sheets, a forms carrier located behind the platen for supporting and guiding said forms to the platen and including a carbon sheet retracting device to which the carbon sheets are attached, a paper table mounted separately from the platen and movable from an erect position at the delivery side of the platen in which the paper table supports the forms and carbon sheets to a horizontal position in front of the platen, and means actuated by movement of the paper table to its horizontal position for operating the retracting device.

22. In a machine of the class described, the combination with the carriage, a platen, means to movably mount the platen on the carriage for displacement from a typing position to a non-typing position to enable a pack of forms wrapped around the platen to be straightened, spring means to displace the platen to the non-typing position, means to hold the platen in the typing position, a paper table, means to movably mount the paper table to enable it to be displaced from a normal position supporting said forms at the delivery side of the platen to a horizontal position in front of the platen, means actuated by the movement of the paper table for releasing the holding means, and a forms gripping device mounted on the paper table having jaws for engaging the leading edges of the forms and a handle for operating said jaws and moving the paper table.

23. In a continuous billing machine, the combination with the platen, a forms carrier located at the introductory side of the platen and including a shifting device operable to effect a displacement of carbon sheets interleaved with continuous forms relative to said forms, a forms supporting and guiding means movably mounted at the delivery side of the platen, means to effect displacement of the platen controlled by movement of said forms supporting and guiding means, means operated by the movement of the form supporting and guiding means for operating said carbon shifting device, a track supported by the forms supporting and guiding means and extending in the direction of feed of the leading edges of the forms away from the delivery side of the platen, and a forms gripping device movably mounted on said track and including an operating member for closing the gripping device upon the leading edges of the forms and for moving said gripping device along said track away from the delivery side of the platen, said operating member also serving as an operating handle for moving the forms supporting and guiding means to thereby operate the carbon shifting device.

24. In a commutator billing machine, the combination of a carriage, a forms carrier for guiding a pack of continuous forms interleaved with carbon sheets onto the carriage and including a track and a carbon sheet anchoring device movably mounted on said track for effecting a displacement between the carbon sheets and the forms, a cross member rigidly supported in the carriage and extending parallel with its line of travel, a member slidably mounted on said cross member, yielding means to hold said slidable member in a central position on said cross member, and an element carried by said slidable member and composed of resilient material projecting into a slot in said track to freely removably attach said track to the carriage.

25. In a continuous billing machine, the combination with the platen, a forms carrier located at the introductory side of the platen and including a carbon shifting device for effecting a displacement of carbon sheets interleaved with continuous forms relative to each other, means for effecting a displacement of the platen to enable the carbon sheets and forms to be displaced relative to one another, a forms gripping device having coacting jaws and means to bring the jaws together to grip the forms and hold said forms while the carbon sheets are being shifted relative to the forms, means to mount said gripping device for sliding movement at the delivery side of the platen to enable said forms to be shifted an additional extent relative to the carbon sheets by gripping said forms and moving the gripping device; and a latch device, cooperating with the gripping device at the end of its travel in shifting the forms relative to the carbon sheets, to hold said forms and gripping device while the first named device is being operated.

26. In a continuous billing machine, the combination with the platen; a forms carrier including a carbon sheet shifting device operable to effect a displacement of carbon sheets interleaved with continuous forms relative to the forms, said forms carrier being located at the introductory side of the platen; a support at the delivery side of the platen; a forms gripping device movably mounted on said support and arranged to receive the leading edges of forms discharged at the delivery side of the platen, said gripping device being movable on said support in the direction of feed of the forms and including means to operate said gripping device to grip the forms and, by movement along said support, to effect a displacement of the forms relative to the carbon sheets besides the displacement effected by the first named device; and means cooperating with the gripping device to hold said gripping device stationary while the first named device is being operated to effect displacement of the carbon sheets relative to the forms.

27. In a continuous billing machine, the combination with the platen, means located at the introductory side of the platen for effecting a displacement between carbon sheets and continuous forms with which said carbon sheets are interleaved, a forms gripping device located at the delivery side of the platen and including an operating member for closing the gripping device upon the leading edges of forms discharged from the platen to hold said forms while the carbon shifting device is being operated, and a normally ineffective holding means rendered operative by said operating means for holding the gripping device against movement while the first named means is being operated.

28. In a continuous billing machine, a platen, a carbon shifting device located at the introductory side of the platen and operable to effect a displacement between carbon sheets interleaved with continuous forms, a track mounted at the delivery side of the platen and extending in the direction of feed of the leading edges of the forms; a forms gripping device guided by said track and including an operating member for closing the gripping device upon the leading edges of said forms, said gripping device, when closed upon the forms and moved along said track, effecting a displacement between the forms and the carbon sheets; and holding means rendered operative by the operating member to engage and hold said gripping device at the end of its travel to effect said displacement.

29. In a continuous billing machine, a platen, a carbon shifting device located at the introductory side of the platen for effecting a displacement between carbon sheets interleaved with the forms and said forms, a second device located at the delivery side of the platen for effecting a supplementary displacement between the carbon sheets and the forms and including a device for gripping the leading edges of said forms and movable away from delivery side of the platen to effect such supplementary displacement, means operative at the end of the displacing movement of the second displacing means to hold said displacing means while the first displacing means is operated, and means to effect an automatic operation of the first named means each time the second named displacing means is operated.

30. In a continuous billing machine, the combination of a carriage, a forms carrier for guiding a pack of forms interleaved with carbon sheets onto the carriage and including a track member and a carbon sheet anchoring device movably mounted on said track member for effecting a displacement between the carbon sheets and the forms, a marginal stop bar mounted in the carriage, a member slidably mounted on the marginal stop bar for movement in either direction of carriage travel, resilient means for maintaining said member in a central position on said rack, one of said members having a projection engaging a slot in the other to enable the track member to be attached to and detached from the carriage at will.

31. In a continuous billing machine, a platen, a carbon shifting device located at the introductory side of the platen, a carbon shifting device located at the delivery side of the platen, a movable support for the second named device, an operating member for the second named device serving also to move said support, and means for operating the first named device through movement of said support by said operating means.

32. In a continuous billing machine, the combination with the platen, a carbon sheet retracting device located at the introductory side of the platen, a forms advancing device located at the delivery side of the platen, a movable support for said advancing device, and means coupling said movable support to the carbon sheet retracting device for operating said carbon sheet retracting device by movement of said support.

CARLTON T. JACKSON.